(12) United States Patent
Kasuya et al.

(10) Patent No.: US 12,443,123 B2
(45) Date of Patent: Oct. 14, 2025

(54) LIGHT-EMITTING DEVICE AND DRAWING APPARATUS

(71) Applicant: FUJIFILM Business Innovation Corp., Tokyo (JP)

(72) Inventors: Yosuke Kasuya, Ebina (JP); Tsutomu Otsuka, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 147 days.

(21) Appl. No.: 17/874,032

(22) Filed: Jul. 26, 2022

(65) Prior Publication Data

US 2022/0357022 A1 Nov. 10, 2022

Related U.S. Application Data

(63) Continuation of application No. PCT/JP2020/026441, filed on Jul. 6, 2020.

(30) Foreign Application Priority Data

Mar. 25, 2020 (JP) .................................. 2020-054928

(51) Int. Cl.
*F21V 29/507* (2015.01)
*B41J 2/45* (2006.01)
(Continued)

(52) U.S. Cl.
CPC .......... *G03G 15/04054* (2013.01); *B41J 2/45* (2013.01); *F21V 21/40* (2013.01);
(Continued)

(58) Field of Classification Search
CPC ...... F21V 29/50; F21V 29/502; F21V 29/507; F21V 29/40; F21V 21/40; B41J 2/447;
(Continued)

(56) References Cited

U.S. PATENT DOCUMENTS 5,257,049 A * 10/1993 Van Peteghem ........... B41J 2/45
346/139 R
9,981,482 B2 5/2018 Tanaka
(Continued)

FOREIGN PATENT DOCUMENTS

CN 101398652 A 4/2009
CN 102317678 A 1/2012
(Continued)

OTHER PUBLICATIONS

Jul. 28, 2020 International Search Report issued in International Patent Application No. PCT/JP2020/026441.
(Continued)

*Primary Examiner* — Douglas X Rodriguez
*Assistant Examiner* — Kendrick X Liu
(74) *Attorney, Agent, or Firm* — Oliff PLC

(57) ABSTRACT

A light-emitting device includes a base that is composed of a metal block that extends in a first direction, multiple light-emitting portions unaligned in the first direction and facing a front surface of the base, the multiple light-emitting portions including multiple light sources that extend in the first direction and that are supported by a support that extends in the first direction, and a handle that is formed below the front surface of the base and that is to be held by an operator with the base placed on a flat surface.

10 Claims, 24 Drawing Sheets

(51) Int. Cl.
*F21V 21/40* (2006.01)
*F21V 29/60* (2015.01)
*G03G 15/04* (2006.01)
*G03G 15/043* (2006.01)
*G03G 21/16* (2006.01)

(52) U.S. Cl.
CPC ............ *F21V 29/507* (2015.01); *F21V 29/60* (2015.01); *G03G 15/043* (2013.01); *G03G 21/1666* (2013.01); *G03G 2215/0409* (2013.01); *G03G 2221/1636* (2013.01)

(58) Field of Classification Search
CPC ................. B41J 2/45; G03G 15/04045; G03G 15/04054; G03G 15/043; G03G 21/1661; G03G 21/1666
See application file for complete search history.

(56) References Cited

U.S. PATENT DOCUMENTS

| | | | | |
|---|---|---|---|---|
| 2002/0051052 | A1* | 5/2002 | Masuda | G06K 15/1247 347/236 |
| 2006/0144840 | A1 | 7/2006 | Wu | |
| 2008/0232844 | A1* | 9/2008 | Taira | G03G 15/04054 399/94 |
| 2009/0087219 | A1 | 4/2009 | Aoshima et al. | |
| 2010/0092214 | A1* | 4/2010 | Itou | B41J 2/45 399/220 |
| 2011/0310626 | A1 | 12/2011 | Itohara et al. | |
| 2013/0100225 | A1 | 4/2013 | Kodo | |
| 2016/0070230 | A1 | 3/2016 | Kokubu et al. | |
| 2017/0223212 | A1* | 8/2017 | Nakatani | H04N 1/29 |
| 2017/0282593 | A1 | 10/2017 | Tanaka | |
| 2017/0289385 | A1* | 10/2017 | Wada | H04N 1/02845 |

FOREIGN PATENT DOCUMENTS

| | | |
|---|---|---|
| JP | S63-065053 U | 4/1988 |
| JP | H03-253363 A | 11/1991 |
| JP | H06320790 A * | 11/1994 |
| JP | 2003-255805 A | 9/2003 |
| JP | 2014-21156 A | 2/2014 |
| JP | 2017-177664 A | 10/2017 |

OTHER PUBLICATIONS

Jul. 28, 2020 Written Opinion of the International Searching Authority issued in International Patent Application No. PCT/JP2020/026441.
May 15, 2024 Office Action issued in Chinese Patent Application No. 202080098219.3.
Sep. 23, 2024 Office Action issued in Chinese Patent Application No. 202080098219.3.

* cited by examiner

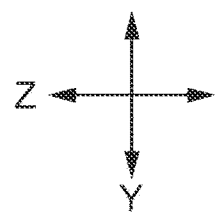
FIG. 19
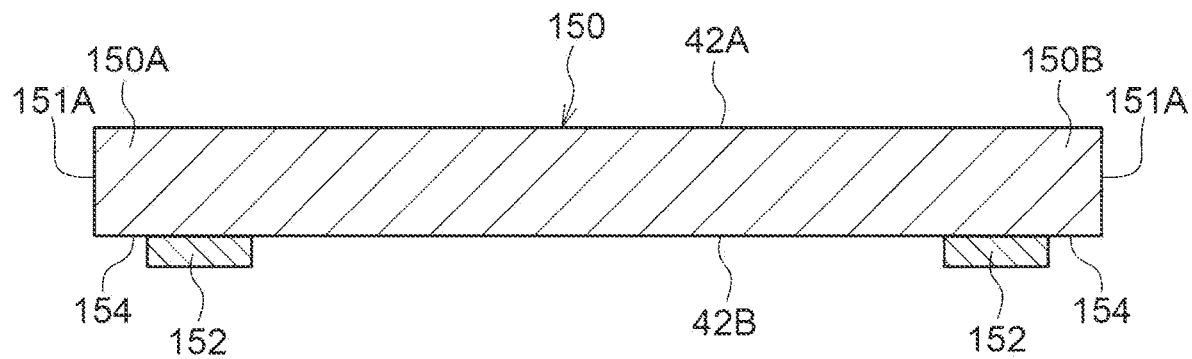

LIGHT-EMITTING DEVICE AND DRAWING APPARATUS

CROSS-REFERENCE TO RELATED APPLICATIONS

This is a continuation of International Application No. PCT/JP2020/026441 filed on Jul. 6, 2020, and claims priority from Japanese Patent Application No. 2020-054928 filed on Mar. 25, 2020.

BACKGROUND

(i) Technical Field

The present disclosure relates to a light-emitting device and a drawing apparatus.

(ii) Related Art

Japanese Unexamined Patent Application Publication No. 2017-177664 described below discloses an exposure device including a first exposure head including multiple first light-emitting elements that are arranged in a first direction and that emit respective first light beams, a first optical system that faces the multiple first light-emitting elements in a second direction intersecting the first direction and that images the respective first light beams emitted from the first light-emitting elements, a first coupler, and a first base that supports the multiple first light-emitting elements, the first optical system, and the first coupler, and a second exposure head including multiple second light-emitting elements that are arranged in the first direction and that emit respective second light beams, a second optical system that faces the multiple second light-emitting elements in the second direction and that images the respective second light beams emitted from the second light-emitting elements, a second coupler that is fitted in the first coupler, and a second base that supports the multiple second light-emitting elements, the second optical system, and the second coupler. As for the exposure device, the first coupler is disposed at a first position on the first base depending on an imaging position of the first optical system. The second coupler is disposed at a second position on the second base depending on an imaging position of the second optical system.

SUMMARY

Aspects of non-limiting embodiments of the present disclosure relate to a light-emitting device and a drawing apparatus that enable an operator to more easily hold a base than the case where a back surface of the base is flat with the base placed on a flat surface.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a light-emitting device including a base that is composed of a metal block that extends in a first direction, a plurality of light-emitting portions unaligned in the first direction and facing a front surface of the base, the plurality of light-emitting portions including a plurality of light sources that is arranged in the first direction and that is supported by a support that extends in the first direction, and a handle that is formed below the front surface of the base and that is to be held by an operator with the base placed on a flat surface.

BRIEF DESCRIPTION OF THE DRAWINGS

Exemplary embodiments of the present disclosure will be described in detail based on the following figures, wherein:

FIG. 19 illustrates a sectional view of the handles of the base that is included in the exposure device according to the seventh exemplary embodiment taken in a first direction (a longitudinal direction);

DETAILED DESCRIPTION

Exemplary embodiments (referred to below as the present exemplary embodiments) for carrying out the present disclosure will hereinafter be described.

First Exemplary Embodiment

Image Forming Apparatus 10

Figure 1:
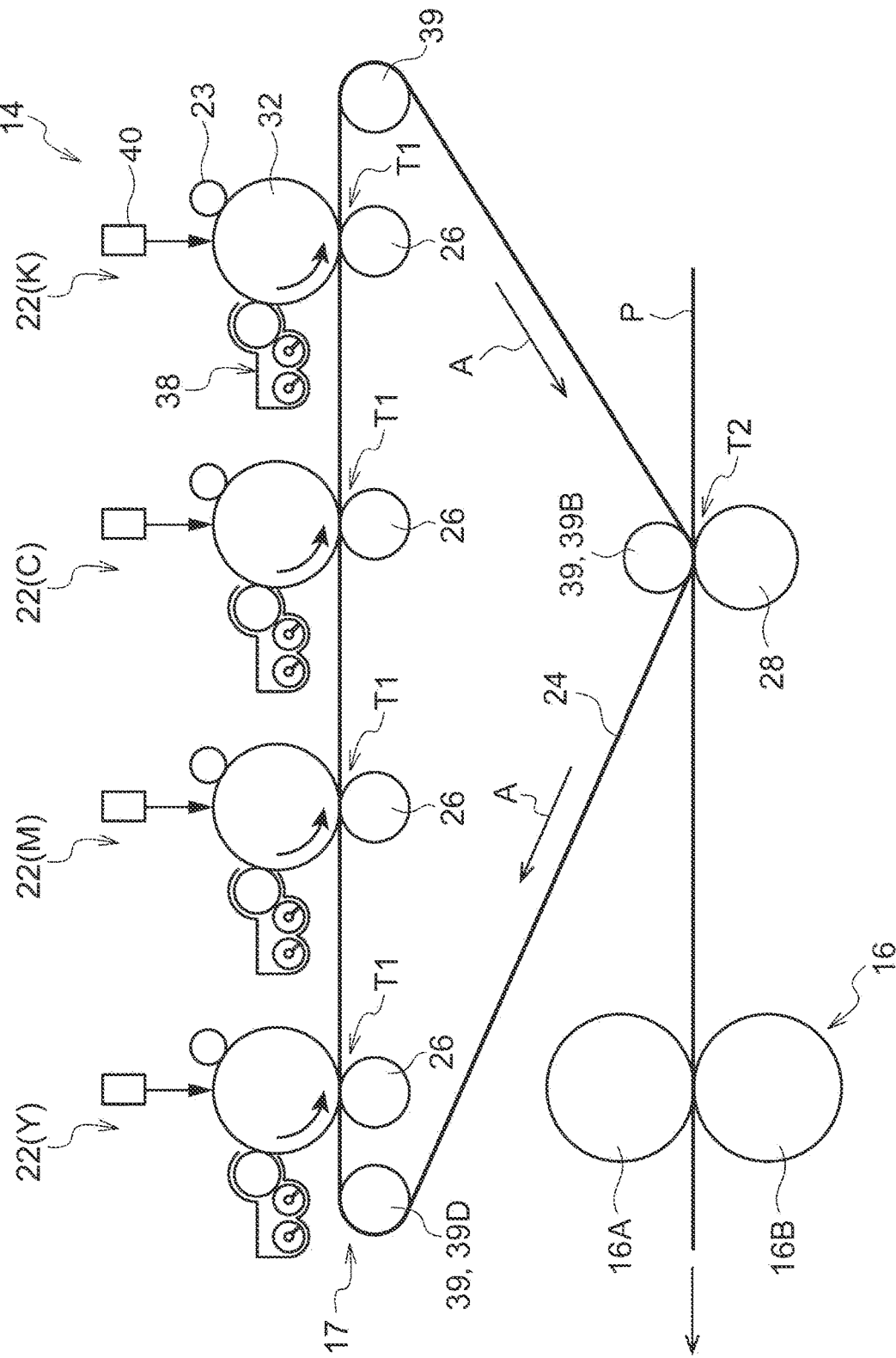
FIG. 1 schematically illustrates an image forming apparatus that includes exposure devices according to a first exemplary embodiment.

FIG. 1 schematically illustrates the structure of an image forming apparatus 10 that includes exposure devices 40 according to a first exemplary embodiment. The structure of the image forming apparatus 10 will now be described. The exposure devices 40 that are used for the image forming apparatus 10 will be described later. The image forming apparatus 10 corresponds to an example of a drawing apparatus. The exposure device 40 corresponds to an example of a light-emitting device. For example, the image forming apparatus 10 forms an image in multiple colors, and an example thereof is a full-color printer for commercial printing that is required for particularly high image quality.

The image forming apparatus 10 is a wide-width image forming apparatus that complies with a width (that is, a width of greater than 364 mm) greater than the width of a recording medium P during B3 portrait feeding and is compatible with the recording medium P that has, for example, a size of 420 mm or more for A2 portrait feeding and a size of 1456 mm or less for B0 landscape feeding. For example, the image forming apparatus 10 complies with 728 mm for B2 landscape feeding.

The image forming apparatus 10 illustrated in FIG. 1 corresponds to an example of an image forming apparatus that forms an image on a recording medium. Specifically, the image forming apparatus 10 is an electrophotographic image forming apparatus that forms a toner image (an example of an image) on the recording medium P. Toner is an example of powder. More specifically, the image forming apparatus 10 includes an image forming unit 14 and a fixing device 16. The components (the image forming unit 14 and the fixing device 16) of the image forming apparatus 10 will now be described.

Image Forming Unit 14

The image forming unit 14 has a function of forming a toner image on the recording medium P. Specifically, the image forming unit 14 includes toner image forming units 22 and a transfer device 17.

Toner Image Forming Units 22

The multiple toner image forming units 22 illustrated in FIG. 1 form toner images in respective colors. According to the present exemplary embodiment, the toner image forming units 22 for four colors of yellow (Y), magenta (M), cyan (C), and black (K) are provided. In FIG. 1, (Y), (M), (C), and (K) represent components for the respective colors described above.

The toner image forming units 22 for the respective colors have the same structure except for the used toner. In FIG. 1, components of the toner image forming unit 22 (K) that is a representative of the toner image forming units 22 for the respective colors are designated by reference characters.

Specifically, each of the toner image forming units 22 for the respective colors includes a photoconductor drum 32 that rotates in a direction (for example, a counterclockwise direction in FIG. 1). The photoconductor drum 32 corresponds to an example of a cylindrical member. A photoconductor member on the surface of the photoconductor drum 32 corresponds to an example of a region in which a photoconductive material is disposed. Each of the toner image forming units 22 for the respective colors includes a charger 23, the exposure device 40, and a developing device 38.

As for each of the toner image forming units 22 for the respective colors, the charger 23 charges the photoconductor drum 32. The exposure device 40 exposes the photoconductor drum 32 that is charged by the charger 23 to light and forms an electrostatic latent image on the photoconductor drum 32. The developing device 38 develops the electrostatic latent image that is formed on the photoconductor drum 32 by using the exposure device 40 and forms the toner image.

The photoconductor drum 32 holds the electrostatic latent image that is thus formed on the outer circumference and rotates. The electrostatic latent image is transported to the developing device 38. The specific structure of the exposure device 40 will be described later.

Transfer Device 17

The transfer device 17 illustrated in FIG. 1 transfers the toner images that are formed by the toner image forming units 22 to the recording medium P. Specifically, the transfer device 17 stacks the toner images that are formed on the photoconductor drums 32 for the respective colors on a transfer belt 24 that serves as an intermediate transfer body for first transfer and transfers the stacked toner images to the recording medium P for second transfer. Specifically, as illustrated in FIG. 1, the transfer device 17 includes the transfer belt 24, first transfer rollers 26, and a second transfer roller 28.

The first transfer rollers 26 transfer the toner images on the photoconductor drums 32 for the respective colors to the transfer belt 24 at first transfer positions T1 between the photoconductor drums 32 and the first transfer rollers 26. According to the present exemplary embodiment, a first transfer electric field is applied between the first transfer rollers 26 and the photoconductor drums 32, and the toner images that are formed on the photoconductor drums 32 are consequently transferred to the transfer belt 24 at the first transfer positions T1.

The toner images are transferred from the photoconductor drums 32 for the respective colors to the outer circumferential surface of the transfer belt 24. Specifically, the transfer belt 24 has a structure described below. As illustrated in FIG. 1, the transfer belt 24 has an annular shape and are wound around multiple rollers 39, and the posture thereof is maintained.

The transfer belt 24 turns in the direction of an arrow A, for example, in a manner in which a drive roller 39D of the multiple rollers 39 rotates by using a drive unit (not illustrated). A facing roller 39B of the multiple rollers 39 illustrated in FIG. 1 faces the second transfer roller 28.

The second transfer roller 28 transfers the toner images that are transferred to the transfer belt 24 to the recording medium P at a second transfer position T2 between the facing roller 39B and the second transfer roller 28. According to the present exemplary embodiment, a second transfer electric field is applied between the facing roller 39B and the second transfer roller 28, and the toner images that are transferred to the transfer belt 24 are transferred to the recording medium P at the second transfer position T2.

Fixing Device 16

The fixing device 16 illustrated in FIG. 1 fixes the toner images that are transferred to the recording medium P by using the second transfer roller 28 to the recording medium P. Specifically, as illustrated in FIG. 1, the fixing device 16 includes a heating roller 16A that serves as a heating member and a pressure roller 16B that serves as a pressure member. The fixing device 16 heats and compresses the recording medium P by using the heating roller 16A and the pressure roller 16B and consequently fixes the toner images that are formed on the recording medium P to the recording medium P.

Exposure Device 40

Figure 2:
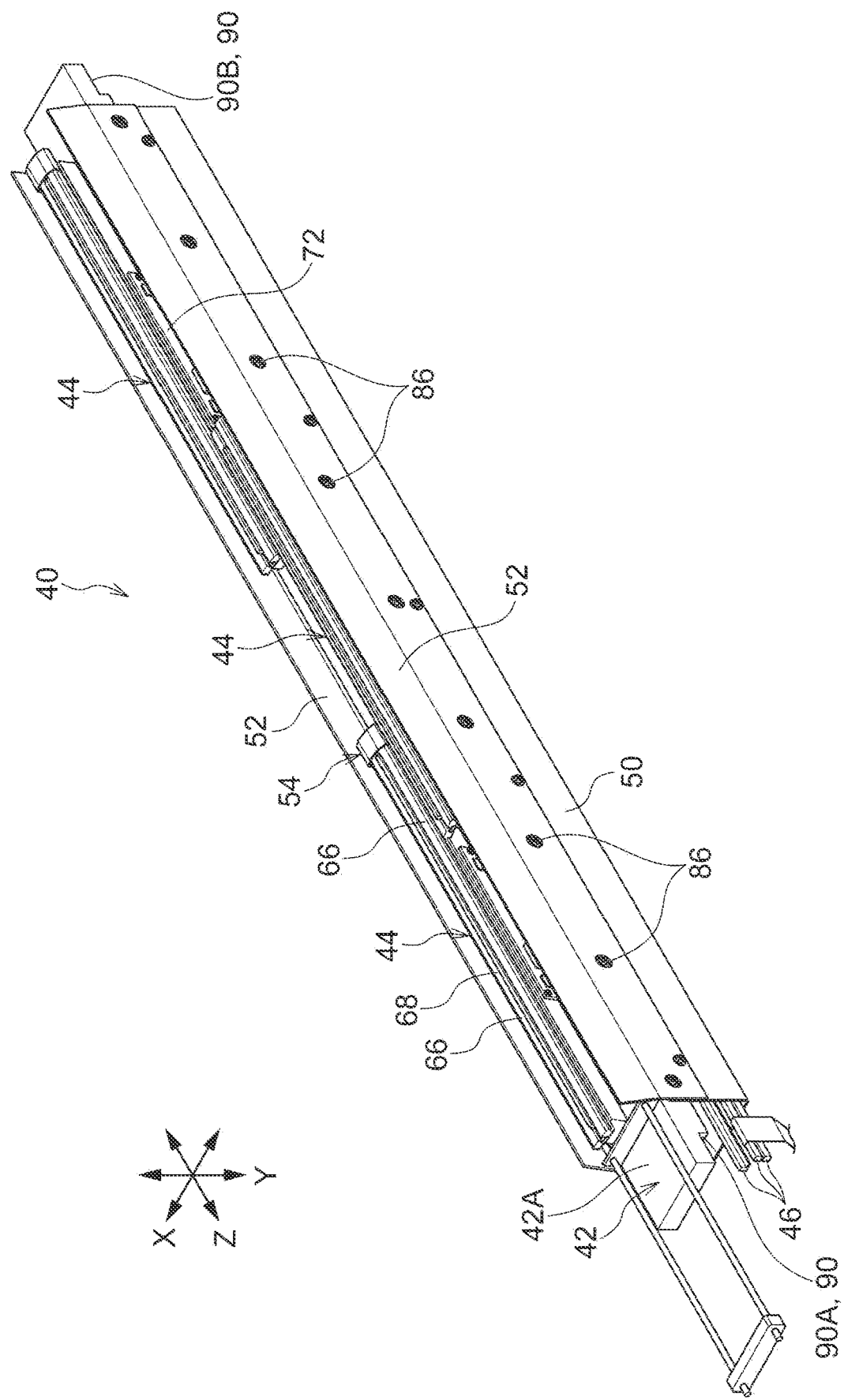
FIG. 2 illustrates a perspective view of one of the exposure devices that is used for the image forming apparatus.
Figure 3:
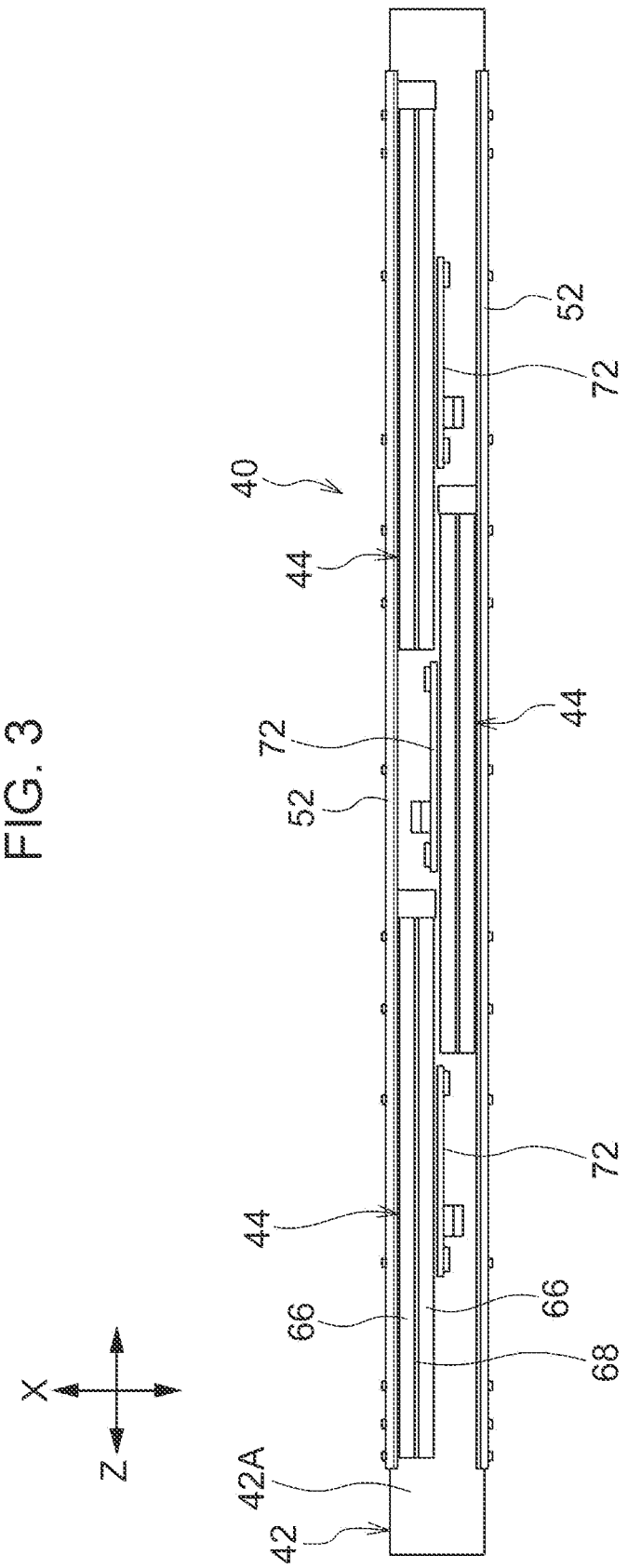
FIG. 3 illustrates the structure of the exposure device viewed in an up-down direction.

The structure of each exposure device 40 that is a principal part according to the present exemplary embodiment will now be described. FIG. 2 illustrates a perspective view of the structure of the exposure device 40. FIG. 3 illustrates a plan view of the exposure device 40 viewed in an up-down direction. In the following description, the direction of an arrow X is the width direction of the exposure device 40 in the figure, and the direction of an arrow Y is the direction of the height of the exposure device 40. The direction of an arrow Z perpendicular to the width direction of the device and the height direction of the device is the depth direction of the exposure device 40. The width direction and the height direction described above are defined for convenience of description. Accordingly, the structure of the exposure device 40 is not limited to the directions.

Entire Structure of Exposure Device 40

The entire structure of the exposure device 40 will now be described, and the components of the exposure device 40 will be described later.

As illustrated in FIG. 2 and FIG. 3, the exposure device 40 includes a base 42 that extends in a first direction (the direction of the arrow Z according to the present exemplary embodiment) and multiple light-emitting portions 44 that face a first surface (face an upper surface in the up-down direction in FIG. 2 and FIG. 3) of the base 42 in the direction of the arrow Y. According to the present exemplary embodiment, three light-emitting portions 44 that extend in the first direction of the base 42 are provided. The base 42 is an elongated member that has a rectangular shape in a plan view in FIG. 3. The light-emitting portions 44 have the same structure and are elongated members that have a rectangular shape in a plan view in FIG. 3. The lengths of the light-emitting portions 44 in the first direction (that is, the longitudinal direction) are shorter than the length of the base 42 in the first direction (that is, the longitudinal direction).

For example, the three light-emitting portions 44 are unaligned in the first direction (the direction of the arrow Z) of the base 42 and are unaligned in the width direction perpendicular to the first direction of the base 42, that is, the transverse direction (the direction of the arrow X) of the base 42. The exposure device 40 is arranged in the axial direction of the photoconductor drum 32 (see FIG. 1). The length of the exposure device 40 in the first direction (the direction of the arrow Z) is equal to or greater than the length of the photoconductor drum 32 in the axial direction. At least one or more of the three light-emitting portions 44 faces a region in which the photoconductor member on the surface of the photoconductor drum 32 is provided. Consequently, light that is emitted from the exposure device 40 is radiated to the surface of the photoconductor drum 32.

As for the exposure device 40 illustrated in, for example, FIG. 2 and FIG. 3, the surface of the base 42 that the light-emitting portions 44 face is the upper surface in the up-down direction, and light is radiated upward from the light-emitting portions 44. As for the image forming apparatus 10 illustrated in FIG. 1, however, the up-down direction of the exposure device 40 is opposite. That is, in FIG. 1, the exposure device 40 is arranged such that the light-emitting portions 44 of the base 42 face downward in the up-down direction, and the light is radiated downward from the light-emitting portions 44 toward the photoconductor drum 32.

According to the present exemplary embodiment, the three light-emitting portions 44 are in a staggered arrangement when viewed from above in the up-down direction of the exposure device 40 (see FIG. 3). More specifically, two of the light-emitting portions 44 are disposed along a side of the base 42 in the transverse direction (the direction of the arrow X) at both end portions of the base 42 in the first direction (the direction of the arrow Z). One of the light-emitting portions 44 is disposed along the other side of the base 42 in the transverse direction (the direction of the arrow X) at a central portion of the base 42 in the first direction (the direction of the arrow Z). End portions of the two light-emitting portions 44 that are disposed along the side of the base 42 in the transverse direction (the direction of the arrow X) overlap end portions of the single light-emitting portion 44 that is disposed along the other side of the base 42 in the transverse direction (the direction of the arrow X) when viewed in the transverse direction (the direction of the arrow X) of the base 42. That is, the range of the light that is radiated from the three light-emitting portions 44 partly overlaps in the first direction (the direction of the arrow Z) of the base 42.

The two light-emitting portions 44 that are disposed along the side of the base 42 in the transverse direction (the direction of the arrow X) do not overlap the single light-emitting portion 44 that is disposed along the other side of the base 42 in the transverse direction (the direction of the arrow X) when viewed in the first direction (the direction of the arrow Z) of the base 42.

Figure 4:
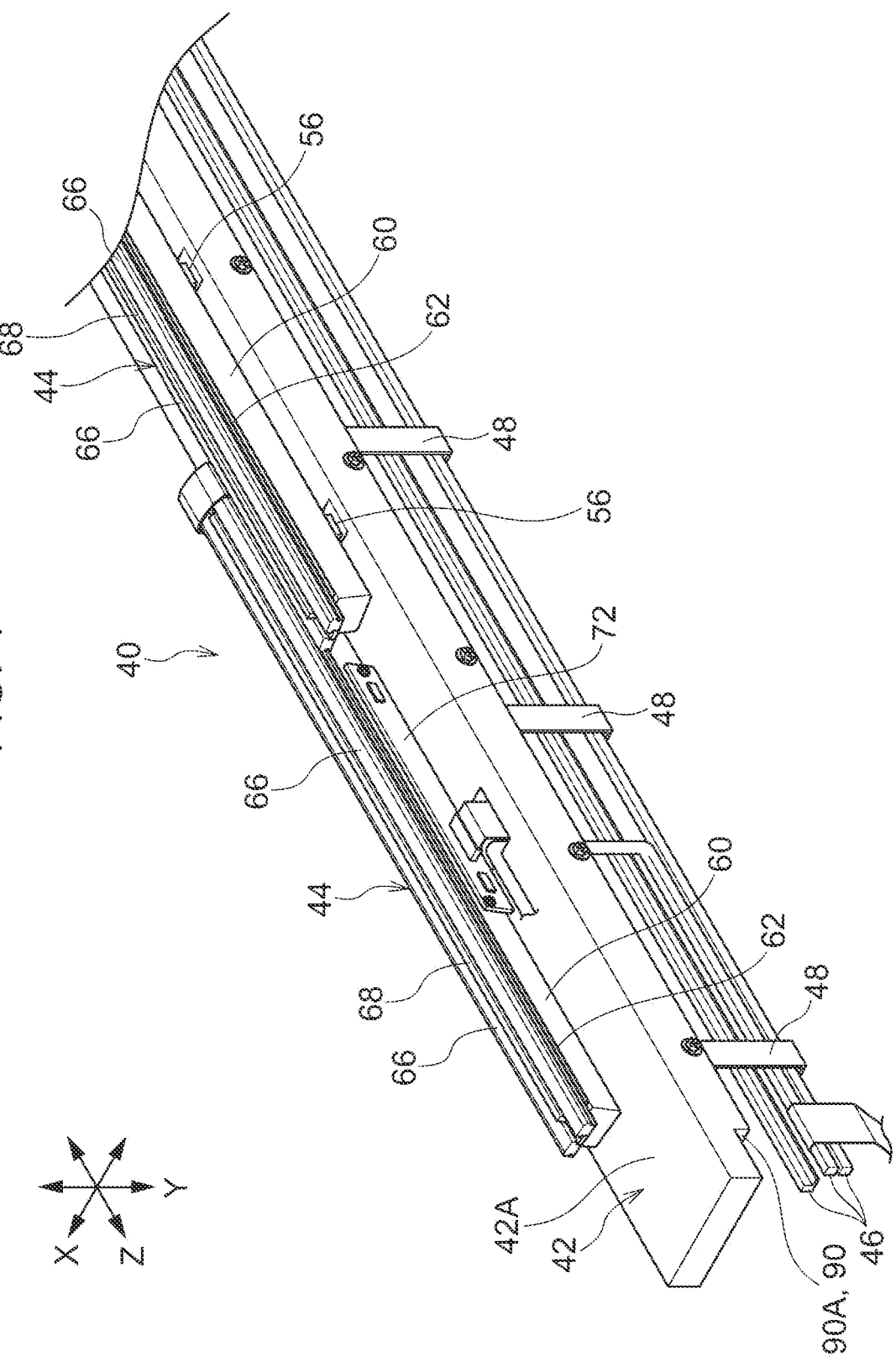
FIG. 4 illustrates an enlarged perspective view of a part of the exposure device.

As illustrated in FIG. 2 and FIG. 4, the exposure device 40 includes harnesses 46 that are electrically connected to the respective three light-emitting portions 44, multiple brackets 48 that support the harnesses 46, and a lower covering 50 that covers the harnesses 46 and the brackets 48 from the outside. The brackets 48 are mounted on the base 42 and extend from the base 42 in the direction of the arrow Y (downward in the up-down direction in FIG. 2). The lower covering 50 is mounted on a second surface of the base 42 in the direction of the arrow Y (a lower surface in the up-down direction in FIG. 2).

As illustrated in FIG. 2 and FIG. 3, the exposure device 40 includes side coverings 52 that cover sides of the three light-emitting portions 44. The side coverings 52 have a plate shape, and lower end portions thereof are mounted on both sides of the base 42 in the transverse direction (the direction of the arrow X). The exposure device 40 includes a cleaning device 54 that cleans lenses 68 of the light-emitting portions 44 described later.

Figure 5:
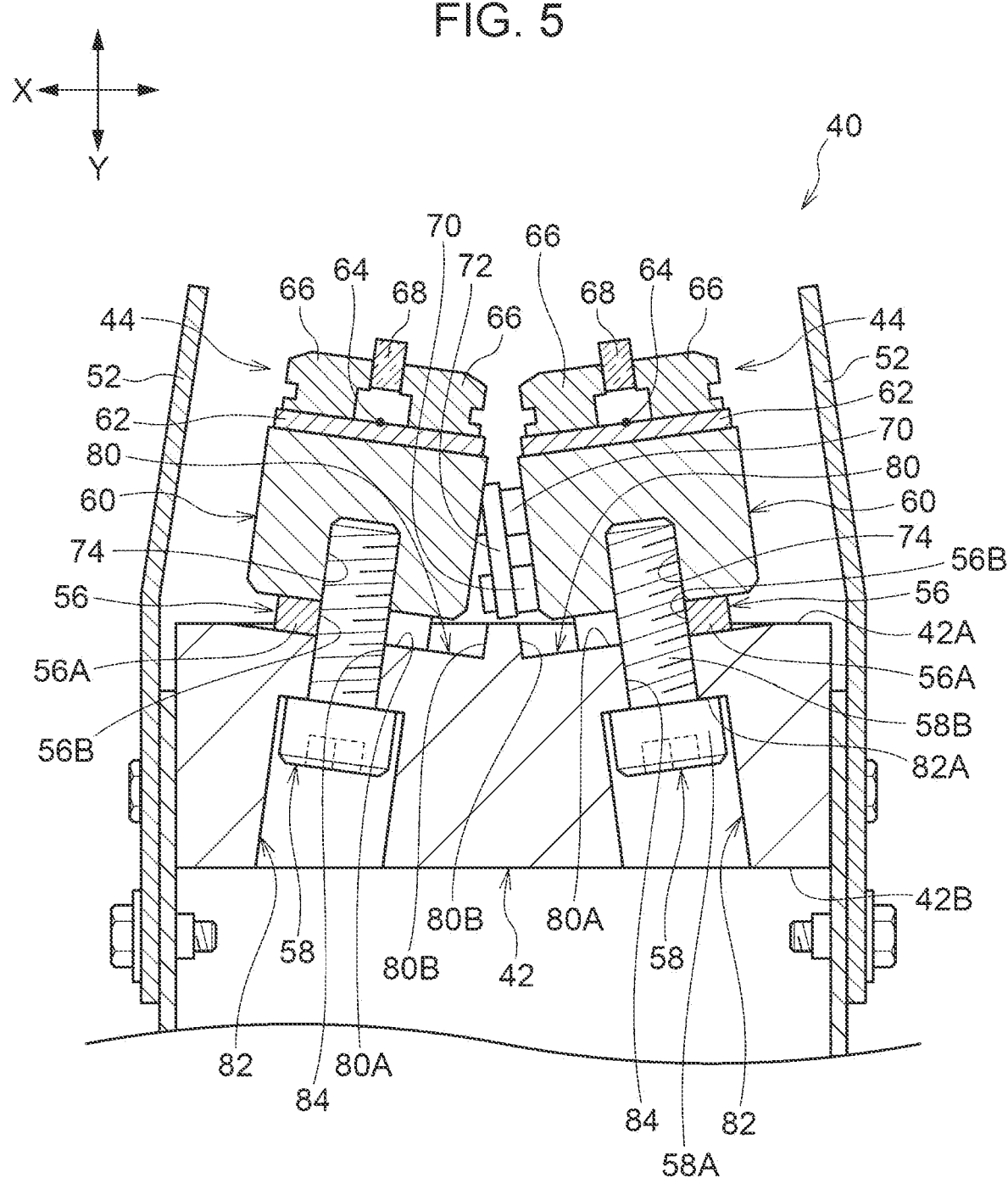
FIG. 5 illustrates a sectional view of light-emitting portions of the exposure device.

As illustrated in FIG. 4 and FIG. 5, the exposure device 40 includes multiple spacers 56 that are put between the base 42 and the light-emitting portions 44 and fasteners 58 that fix the light-emitting portions 44 to the base 42 with the multiple spacers 56 interposed therebetween. For example, the fasteners 58 are members that have spiral grooves and use the grooves for fastening. In other words, the fasteners 58 have screw mechanisms, and examples thereof include a screw, a bolt, and a screw nail.

Positioning shafts that extend upward in the up-down direction are disposed at both end portions of the base 42 in the first direction (the direction of the arrow Z) although this is not illustrated. The positioning shafts come into contact with bearing members that are disposed at ends of the photoconductor drums 32 and adjust the positions of the exposure devices 40 in a radiation direction with respect to the photoconductor drums 32.

Base 42

Figure 6:
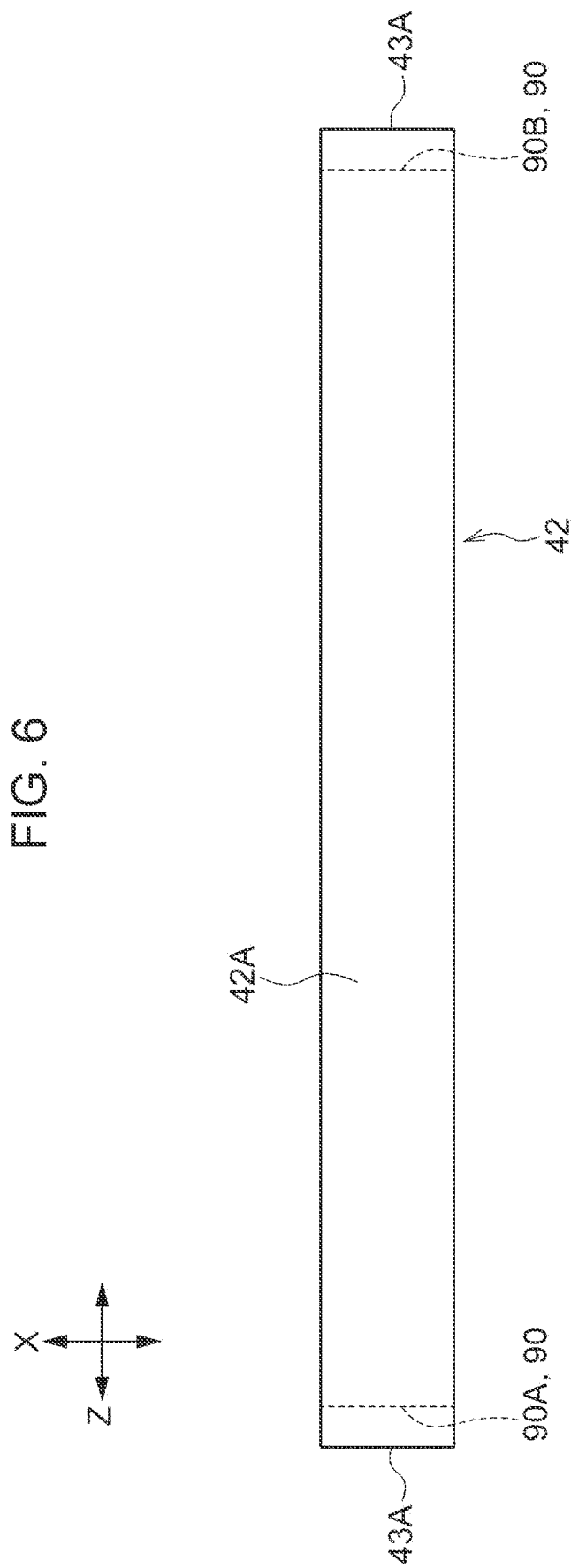
FIG. 6 illustrates a plan view of handles of a base that is included in the exposure device.
Figure 7:
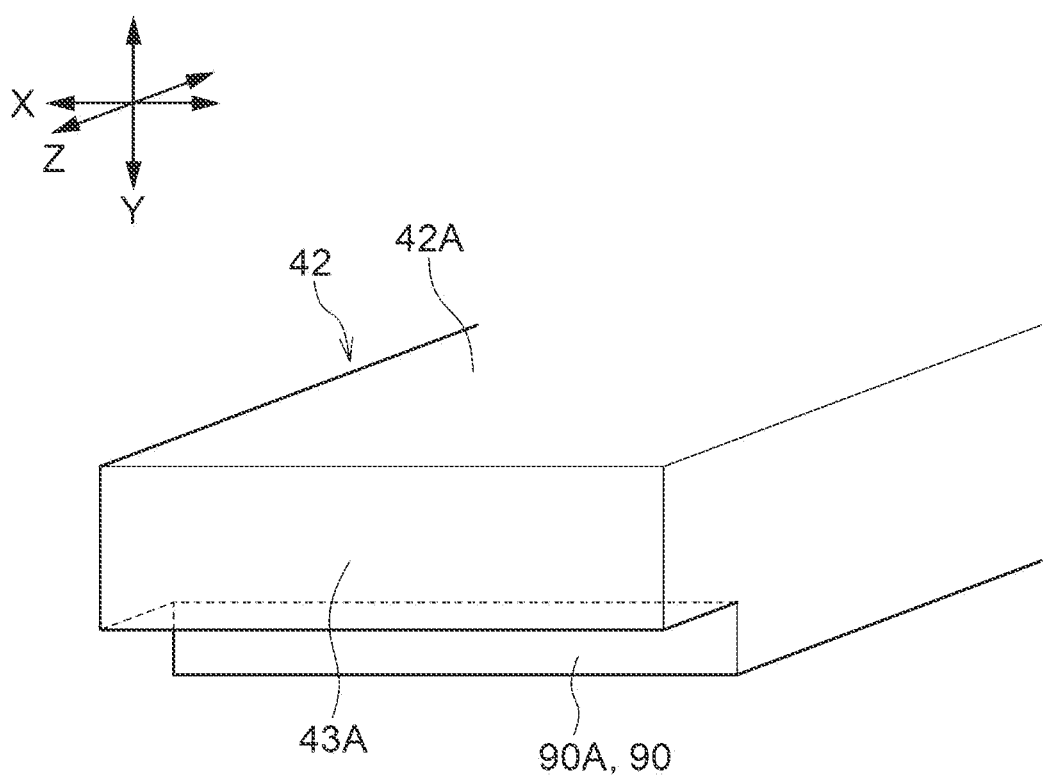
FIG. 7 illustrates a perspective view of one of the handles of the base that is included in the exposure device.

As illustrated in FIG. 4 to FIG. 7, the base 42 includes an elongated member that has a rectangular cuboid shape. The base 42 faces the photoconductor drum 32 (FIG. 1) over the entire length in the axial direction. In FIG. 6 and FIG. 7, the base 42 is schematically illustrated to make the structure of the base 42 easy to understand, and an illustration of recessed portions 80 described below is omitted.

The recessed portions 80 in which the spacers 56 are inserted are formed on a front surface 42A of the base 42 in the up-down direction (the direction of the arrow Y) that face upward (see FIG. 5). For example, three spacers 56 are arranged at an interval in the first direction (the direction of the arrow Z) for the single light-emitting portion 44. According to the present exemplary embodiment, three spacers 56 are disposed for each of the three light-emitting portions 44.

Each recessed portion 80 has an inclined surface 80A that defines a bottom surface and that is inclined with respect to the front surface 42A of the base 42, a vertical wall 80B that is located at an end portion of the inclined surface 80A in a downward direction, and two vertical walls (not illustrated) that face each other along both sides of the inclined surface 80A (see FIG. 5). For example, the inclined surface 80A that faces the two light-emitting portions 44 that are disposed along the side of the base 42 in the transverse direction is inclined in a direction opposite a direction in which the inclined surface 80A that faces the single light-emitting portion 44 that is disposed along the other side of the base 42 in the transverse direction is inclined. The exposure device 40 is adjusted such that light is radiated from the two light-emitting portions 44 that are disposed along the side of the base 42 in the transverse direction and the single light-emitting portion 44 that is disposed along the other side of the base 42 in the transverse direction toward a central portion of the photoconductor drum 32 (see FIG. 1) by using the inclined surfaces 80A that are inclined in the opposite directions.

According to the present exemplary embodiment, the base 42 is composed of a metal block. According to the present exemplary embodiment, the meaning of the metal block does not include a typical metal plate that is formed by a bending process but includes a metal lump the thickness of which makes the bending process unable to perform on the metal lump that is used as the base of the exposure device 40. For example, the ratio of the thickness of the metal lump to the width of the base 42 is 10% or more. Furthermore, as for the metal lump, the ratio of the thickness of the base 42 to the width of the base 42 may be no less than 20% and no more than 100%.

An existing wide-width image forming apparatus is used for outputting a monochrome drawing that is not required for high image quality unlike a full-color printer for commercial printing and typically uses a metal plate as a base. The image forming apparatus 10 according to the present exemplary embodiment is a full-color printer for commercial printing and is required for high image quality. In view of this, the metal block that is used has rigidity higher than that of the metal plate to reduce an influence on image quality due to a bend in the base 42.

The base 42 is composed of, for example, steel or stainless steel. The base 42 may be composed of a metal block other than steel or stainless steel. For example, aluminum that has a thermal conductivity higher than that of steel or stainless steel and that is lightweight may be used. According to the present exemplary embodiment, heat that is generated by light sources 64 is mostly dissipated by supports 60. For this reason, the rigidity is prioritized over the thermal conductivity and the weight, and steel or stainless steel is used for the base 42.

The thickness of the base 42 in the up-down direction (the direction of the arrow Y) may be greater than the thicknesses of the supports 60 that are included in the light-emitting portions 44. Consequently, the rigidity (flexural rigidity in the direction of the arrow Y) of the base 42 is greater than the rigidity of the light-emitting portions 44. The thickness of the base 42 in the up-down direction (the direction of the arrow Y) is preferably 5 mm or more, more preferably 10 mm or more, further preferably 20 mm or more.

As illustrated in FIG. 5, recessed portions 82 that are cut toward the spacers 56, that is, the recessed portions 80 are formed on a back surface 42B opposite the front surface 42A of the base 42. The recessed portions 82 are formed so as to be associated with the respective recessed portions 80 of the base 42. The recessed portions 82 are formed in oblique directions from the back surface 42B of the base 42 toward the central portion of the base 42 in the transverse direction (an X-direction). For example, the recessed portions 82 are circular when viewed from the back surface 42B of the base 42. The inner diameters of the recessed portions 82 are larger than those of heads 58A of the fasteners 58. Through-holes 84 for heads 58B of the fasteners 58 that extend through the base 42 from bottom surfaces 82A of the recessed portions 82 are formed. The through-holes 84 open from the inclined surfaces 80A of the recessed portions 80.

As illustrated in FIG. 4, FIG. 6, and FIG. 7, handles 90A and 90B that are recessed from the back surface 42B are formed at both end portions of the base 42 in the first direction (the direction of the arrow Z). The shapes of the handles 90A and 90B are symmetric with each other in the first direction (the direction of the arrow Z) of the base 42. In the case where it is not necessary to distinguish between the handles 90A and 90B, A and B are omitted, and these are referred to as the handles 90. The handles 90 are formed on the back surface 42B of the base 42 opposite the light-emitting portions 44 (see FIG. 4). That is, the handles 90 are formed below the front surface 42A of the base 42 in the up-down direction (the direction of the arrow Y). For example, as for the handles 90, corner portions that extend in the transverse direction (the X-direction) of the back surface 42B of the base 42 are cut. In other words, the handles 90 are recessed portions that are formed at both ends of the back surface 42B of the base 42 in the first direction (the direction of the arrow Z). According to the present exemplary embodiment, the shapes of the handles 90 are rectangular.

The handles 90 are to be held by an operator with the back surface 42B of the base 42 placed on a flat surface. More specifically, each handle 90 has a shape that enables fingers of the operator to catch on the handles with the back surface 42B of the base 42 placed on a flat surface, that is, a shape that enables fingers of the operator to be inserted from spaces between the flat surface on which the base 42 is placed and the handles 90. Each handle 90 has a shape that enables fingers of the operator to be inserted from both end portions of the base 42 in the first direction (the direction of the arrow Z). For example, the handles 90 are formed outside the outermost position on the three light-emitting portions 44 in the first direction (the direction of the arrow Z).

For example, as for the handles 90, the corner portions are cut from the back surface 42B of the base 42 by a cutting process. For example, as for the handles 90, a depth in the depth direction from the back surface 42B of the base 42 is 10 mm or more, and a depth in the depth direction from each of end surfaces 43A of the base 42 in the first direction is 10 mm or more. As for the handles 90, a depth in the depth direction from an outer surface of the base 42 is preferably 10 mm or more, more preferably 15 mm or more, further preferably 20 mm or more. In this way, the operator may be easy to insert fingers into the handles 90 and may reduce an influence due to a difference between the operator and another operator.

Light-Emitting Portions 44

As illustrated in FIG. 2 to FIG. 5, the three light-emitting portions 44 have the same structure as described above. For example, the two light-emitting portions 44 along the side of the base 42 in the transverse direction (the direction of the arrow X) and the single light-emitting portion 44 along the other side of the base 42 in the transverse direction (the direction of the arrow X) are symmetric with each other in the transverse direction (the direction of the arrow X) of the base 42.

As illustrated in FIG. 5, each light-emitting portion 44 includes the support 60 that extends in the first direction (the direction of the arrow Z) and a light-emitting element substrate 62 that is supported by a surface (an upper surface in the up-down direction according to the present exemplary embodiment) of the support 60 opposite the base 42 in the up-down direction (the direction of the arrow Y). Multiple light sources 64 that are arranged in the first direction are disposed on the light-emitting element substrate 62. According to the present exemplary embodiment, for example, the light sources 64 include multiple light-emitting elements. For example, each light source 64 is a light-emitting element array that includes a semiconductor substrate and multiple light-emitting elements that are formed on the semiconductor substrate in the first direction. According to the present exemplary embodiment, the light-emitting element arrays that are the light sources 64 are on the light-emitting element substrate 62 in a staggered arrangement in the first direction. Each light source 64 may be a single light-emitting element instead of the light-emitting element array. Each light-emitting element includes a light-emitting diode, a light-emitting thyristor, and a laser element, is arranged in the first direction, and has a resolution of, for example, 2400 dpi. The light-emitting element substrate 62 is used to let one or more of the multiple light sources 64 emit light. In FIG. 5, one of the light sources 64 that are disposed on each light-emitting portion 44 is illustrated, and an illustration of the other light sources is omitted.

Each light-emitting portion 44 includes a pair of mount portions 66 that is disposed on a surface of the light-emitting element substrate 62 opposite the support 60 and the lens 68 that is held with the lens 68 put between upper end portions of the pair of the mount portions 66.

The mount portions 66 and the lenses 68 extends in the first direction (the direction of the arrow Z) of the supports 60 (see, for example, FIG. 4). The lenses 68 are opposite the multiple light sources 64, and spaces are formed between the lenses 68 and the multiple light sources 64. As for the exposure device 40, light that is emitted from the multiple light sources 64 passes through the lenses 68 and is radiated to the surfaces of the photoconductor drums 32 (see FIG. 1) to be irradiated.

Each light-emitting portion 44 includes a drive substrate 72 that is mounted on the support 60 by using an attachment 70. In other words, a gap is formed between the support 60 and the drive substrate 72 due to the attachment 70. The drive substrate 72 is used to drive the light-emitting portion 44, and an example thereof is an application specific integrated circuit (ASIC) substrate.

Each support 60 includes a member that has a rectangular cuboid shape. According to the present exemplary embodiment, the support 60 is composed of a metal block as in the base 42. For example, the support 60 is composed of steel or stainless steel. The base 42 may be composed of a metal block other than steel or stainless steel. For example, the metal block may be aluminum that has a thermal conductivity higher than that of steel or stainless steel and that is lightweight. When the base 42 and the support 60 have different thermal expansion coefficients, distortion or a bend may occur. For this reason, the base 42 and the support 60 may be composed of the same material from the perspective of a reduction in distortion or a bend.

Screw holes 74 into which the heads 58B of the fasteners 58 are screwed are formed on surfaces of the supports 60 facing the base 42. The screw holes 74 face the through-holes 84 of the base 42.

The fasteners 58 are inserted in the recessed portions 82 of the base 42, and the heads 58B of the fasteners 58 extend through the through-holes 84 of the base 42. In this state, the heads 58B of the fasteners 58 are fastened in the screw holes 74 of the supports 60 with the spacers 56 interposed therebetween. Consequently, the light-emitting portions 44 are fixed to the base 42 from the insides of the recessed portions 82 of the base 42 by using the fasteners 58. The spacers 56 are interposed between the base 42 and the supports 60 with the light-emitting portions 44 fixed to the base 42 by using the fasteners 58.

It is thought that the fasteners 58 are used for fixing from the front surfaces (exit surfaces) of the supports 60 to the front surface of the base 42. According to the present exemplary embodiment, however, the supports 60 are composed of heavy metal blocks unlike a support that is composed of a resin material and a support composed of a metal plate. For this reason, the sizes of the fasteners 58 need to be suitable for mass. In this case, spaces for the fasteners 58 that are large are needed near the front surfaces of the supports 60, and the sizes of the supports 60 increase. According to the present exemplary embodiment, fastening starts from the back surfaces of the supports 60.

In the case where the fasteners 58 are disposed not only at both ends of each support 60 but also at central portions, fastening from the front surfaces of the supports 60 is difficult because the light sources 64 are located at the central portions. Fastening from the back surfaces of the base 42 enables fastening other than fastening from the back surfaces of the base 42 to be eliminated in the case of fastening at both ends of each support 60 and at the central portions.

The screw holes 74 and the recessed portions 82 of the base 42 overlap the light sources 64 when viewed in the optical axis direction of the light sources 64. With this structure, heat that is generated by the light sources 64 is more likely to escape toward the base 42 via the fasteners 58 than the case where these do not overlap the light sources 64.

Spacers 56

As illustrated in FIG. 5, the spacers 56 are put between the base 42 and the light-emitting portions 44 in the optical axis direction of the light sources 64. For example, each spacer 56 has a plate shape and is formed by a member (that is, a single member). According to the present exemplary embodiment, the spacer 56 has a U-shape when viewed in the optical axis direction of the light sources 64. The spacer 56 includes a body 56A and a depressed portion 56B obtained by cutting a side of the body 56A.

The spacers 56 are disposed on the inclined surfaces 80A of the recessed portions 80 of the base 42. The thicknesses of the spacers 56 are equal to or greater than the depths of the recessed portions 80 at positions at which the spacers 56 are disposed on the inclined surfaces 80A. The fasteners 58 fix the light-emitting portions 44 to the base 42 such that compressive load is applied to the spacers 56.

Lower Covering 50

As illustrated in FIG. 2, the lower covering 50 covers the harnesses 46 that are electrically connected to the respective three light-emitting portions 44 as described above. The lower covering 50 is an example of a covering. The lower covering 50 is mounted on the lower surface of the base 42 in the up-down direction (that is, the back surface 42B of the base 42 illustrated in FIG. 5), projects from the base 42 to a position opposite the light-emitting portions 44 and covers a part of the back surface 42B of the base 42. According to the present exemplary embodiment, the lower covering 50 has a U-shaped section, and upper end portions of the lower covering 50 are mounted on both sides of the base 42 in the transverse direction (the direction of the arrow X) by using multiple fasteners 86.

The length of the lower covering 50 in the first direction (the direction of the arrow Z) is shorter than the length of the base 42 in the first direction (the direction of the arrow Z). In other words, the area of the lower covering 50 is smaller than the area of the base 42 when viewed from the back surface 42B of the base 42. The handles 90 on both ends of the base 42 in the first direction are formed outside the lower covering 50 in the first direction. That is, the handles 90 are formed on the back surface 42B of the base 42 outside the lower covering 50. Consequently, the handles 90 and a part of the back surface 42B of the base 42 are exposed to the outside in the first direction of the lower covering 50 with the lower covering 50 placed on a flat surface.

Action and Effect

Action and effect according to the present exemplary embodiment will now be described.

The exposure device 40 includes the base 42 that is composed of a metal block that extends in the first direction (the direction of the arrow Z) and the light-emitting portions 44 that include the multiple light sources 64 that are arranged in the first direction and that are supported by the supports 60 that extend in the first direction.

As for the exposure device 40, the base 42 extends along the photoconductor drum 32 over the entire length in the axial direction. The three light-emitting portions 44 are unaligned in the first direction of the base 42, and at least one or more of the three light-emitting portions 44 faces the region in which the photoconductor member of the photoconductor drum 32 is disposed in the axial direction. As for the exposure device 40, light is radiated from the light-emitting portions 44 to the photoconductor drum 32, and the electrostatic latent image is formed in the region in which the photoconductor member of the photoconductor drum 32 is disposed.

As for the exposure device 40 described above, the three light-emitting portions 44 are disposed along the base 42 that is composed of a metal block. For this reason, the total mass of the exposure device 40 is more than that in the case where three light-emitting portions are disposed on a metal plate.

For this reason, there is a need for a structure that allows the operator to easily hold the base 42 of the exposure device 40 during the operation of the exposure device 40. Examples of the operation described herein include manufacture and maintenance.

As for the exposure device 40 according to the present exemplary embodiment, the handles 90 that are recessed from the back surface 42B of the base 42 are formed at both end portions of the base 42 in the first direction (the direction of the arrow Z). The handles 90 are to be held by the operator with the back surface 42B of the base 42 placed on a flat surface.

As for the exposure device 40, the handles 90 have a shape that enables fingers of the operator to catch on the handles.

As for the exposure device 40, the handles 90 are the recessed portions that are formed on the base 42. In this way, as for the exposure device 40, the handles 90 may be more easily formed than the case where handles project from a base.

As for the exposure device 40, the handles 90 are formed on the back surface 42B of the base 42 opposite the light-emitting portions 44. In this way, as for the exposure device 40, the handles 90 may be more easily formed than the case where a projecting portion that projects from a back surface of a base is provided.

As for the exposure device 40, the handles 90 are formed at least at an end of the base 42 in the first direction (the direction of the arrow Z). In this way, as for the exposure device 40, the handles 90 may be more easily formed than the case where a projecting portion that projects from an end of a base in the first direction is provided.

As for the exposure device 40, the handles 90 are formed outside the outermost position on the three light-emitting portions 44 in the first direction (the direction of the arrow Z). For this reason, as for the exposure device 40, a hand of the operator is more unlikely to interfere with the light-emitting portions 44 than a structure in which a handle is formed inside the outermost position on multiple light-emitting portions in the first direction.

As for the exposure device 40, the handles 90 have a shape that enables fingers of the operator to be inserted from both end portions of the base 42 in the first direction (the direction of the arrow Z). In this way, as for the exposure device 40, the base 42 may be more easily lifted than the case where fingers of the operator are inserted from an end of the base 42 in the first direction, a base is lifted, and fingers are subsequently inserted from the other. For example, the base 42 may be easily lifted by inserting fingers of the single operator into the handles 90 from both ends.

As for the exposure device 40, the handles 90 have a depth of 10 mm or more in the depth direction from the outer surface of the base 42. In this way, as for the exposure device 40, fingers of the operator are more easily inserted into the handles 90 than the case where the depth in the depth direction from the outer surface of the base 42 is less than 10 mm.

As for the exposure device 40, the handles 90 are formed by cutting parts of the back surface 42B of the base 42. In this way, as for the exposure device 40, the handles may be more easily formed than a structure that includes a projecting portion that projects from an outer surface of a base.

The exposure device 40 includes the lower covering 50 that projects from the base 42 to a position opposite the light-emitting portions 44 and that covers a part of the back surface 42B of the base 42. The handles 90 that are formed on the back surface 42B of the base 42 are to be held by the operator with a lower portion of the lower covering 50 placed on a flat surface.

As for the exposure device 40, the lower covering 50 covers the harnesses 46 that are connected to the respective light-emitting portions 44. In this way, as for the exposure device 40, a handle may be formed by using the lower covering 50 unlike the case where a base includes an exclusive mount member.

As for the exposure device 40, the supports 60 are composed of metal blocks.

As for the exposure device 40, the base 42 is composed of stainless steel or steel. The specific gravity of stainless steel and steel is about three times the specific gravity of an aluminum alloy.

The image forming apparatus 10 includes the exposure devices 40 and the photoconductor drums 32 that relatively move in a direction that intersects the first direction (a Z-direction) with respect to the exposure devices 40 and that are irradiated with light from the exposure devices 40. The surfaces of the photoconductor drums 32 have the regions in which the photoconductive materials are disposed.

As for the image forming apparatus 10, the surfaces of the photoconductor drums 32 corresponding to cylindrical members that rotate in a circumferential direction have the regions in which the photoconductive materials are disposed.

Second Exemplary Embodiment

An exposure device according to a second exemplary embodiment will now be described. A basic structure of the exposure device according to the second exemplary embodiment is the same as that of the exposure device 40 according to the first exemplary embodiment. Components and members according to the second exemplary embodiment like to those according to the first exemplary embodiment, for example, are designated like reference characters, the detailed description thereof is omitted, and a difference therebetween will be described.

Figure 8:
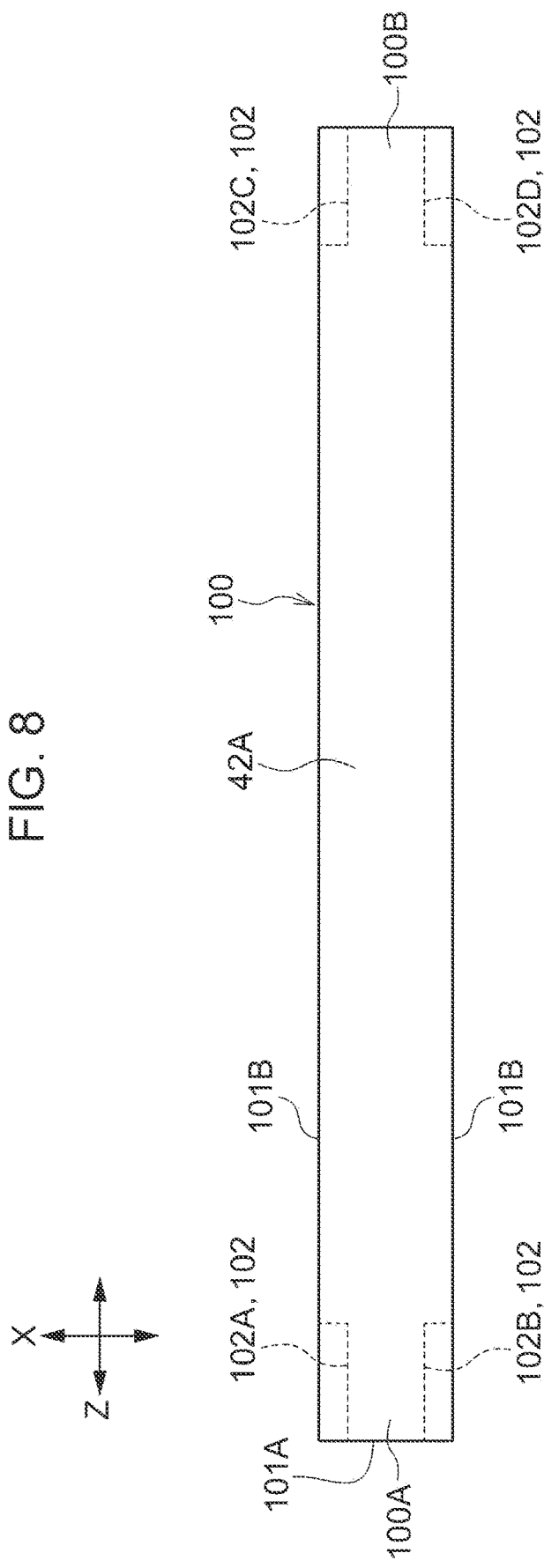
FIG. 8 illustrates a plan view of handles of a base that is included in an exposure device according to a second exemplary embodiment.
Figure 9:
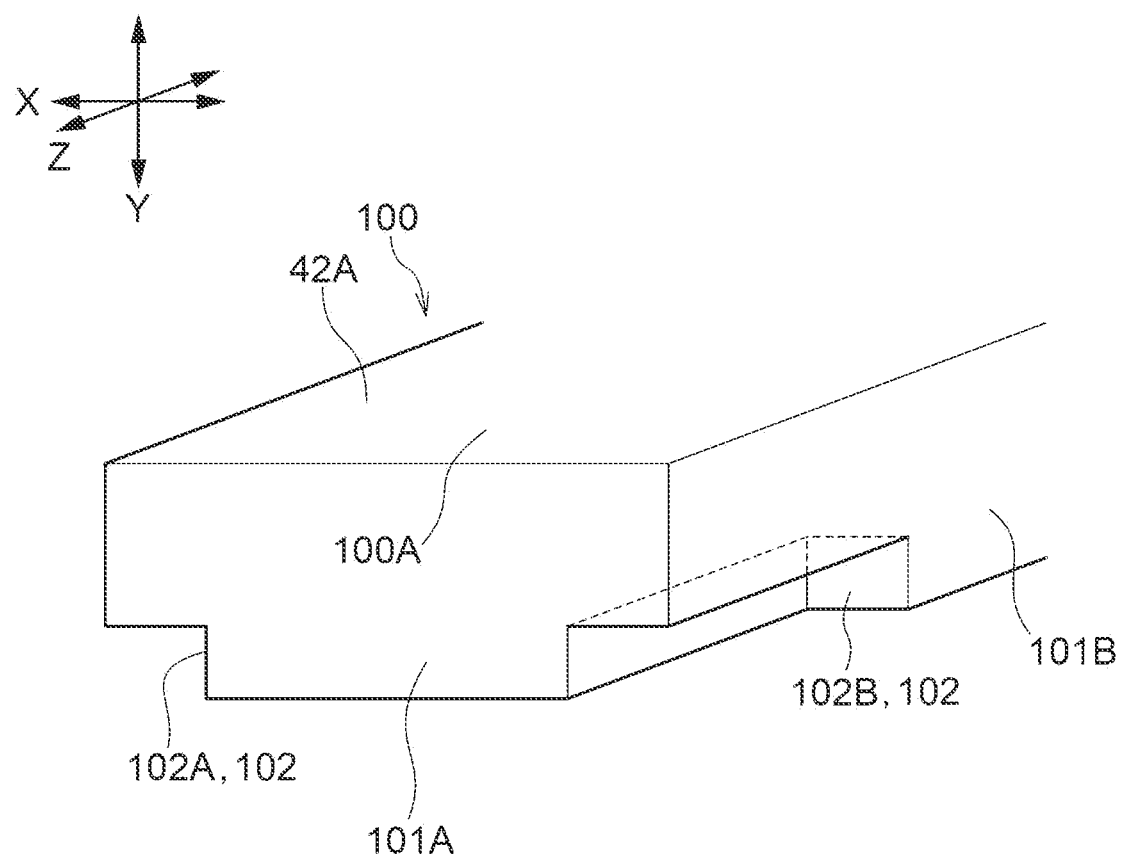
FIG. 9 illustrates a perspective view of some of the handles of the base that is included in the exposure device according to the second exemplary embodiment.

FIG. 8 and FIG. 9 illustrate a base 100 that is used for the exposure device according to the second exemplary embodiment. As for the exposure device according to the second exemplary embodiment, the difference is only the base 100, and the other structure is the same as that of the exposure device 40 according to the first exemplary embodiment. As illustrated in FIG. 8 and FIG. 9, the base 100 is composed of a metal block that has a rectangular cuboid shape. The base 100 includes handles 102A and 102B that are formed along both sides of the base 100 in the transverse direction (the direction of the arrow X) perpendicular to the first direction at an end portion 100A in the first direction (the direction of the arrow Z). The base 100 also includes handles 102C and 102D that are formed along both sides of the base 100 in the transverse direction (the direction of the arrow X) at another end portion 100B in the first direction (the direction of the arrow Z) (see FIG. 8). In the case where it is not necessary to distinguish among the handles 102A, 102B, 102C, and 102D, these are referred to as the handles 102 in some cases.

The handles 102A and 102B are recessed portions that are recessed from a back surface (a surface opposite the front surface 42A) of the base 100 (see FIG. 9). The handles 102A and 102B are formed by cutting corner portions of an end surface 101A of the base 100 in the first direction (the direction of the arrow Z) and end surfaces 101B of the base 100 in the transverse direction (the direction of the arrow X) on the back surface (the surface opposite the front surface 42A) of the base 100. According to the present exemplary embodiment, the shapes of the handles 102A and 102B are rectangular shapes. The handles 102A and 102B are to be held by the operator with the back surface of the base 100 placed on a flat surface. The handles 102A and 102B have a shape that enables fingers of the operator to catch on the handles, that is, a shape that enables fingers of the operator to be inserted between the flat surface and the handles 102A and 102B.

The handles 102C and 102D are bilaterally symmetric with the handles 102A and 102B in the first direction (the direction of the arrow Z) of the base 100.

The exposure device according to the second exemplary embodiment has action and effect described below in addition to action and effect achieved by the same structure as that of the exposure device 40 according to the first exemplary embodiment.

As for the exposure device according to the second exemplary embodiment, the handles 102 (that is, the handles 102A, 102B, 102C, and 102D) may be more easily formed than the case where a projecting portion that projects from both sides of a base in the transverse direction is provided.

As for the exposure device according to the second exemplary embodiment, the base 100 may be more easily lifted than the case where fingers of the operator are inserted from a side of the base 100 in the transverse direction, and fingers are subsequently inserted from the other. For example, one of two operators inserts fingers into the handles 102A and 102B, and the other of the two operators inserts fingers into the handles 102C and 102D. In this way, the base 100 may be easy to lift.

Third Exemplary Embodiment

An exposure device according to a third exemplary embodiment will now be described. A basic structure of the exposure device according to the third exemplary embodiment is the same as that of the exposure device 40 according to the first exemplary embodiment. Components and members according to the third exemplary embodiment like to those according to the first exemplary embodiment, for example, are designated like reference characters, the detailed description thereof is omitted, and a difference therebetween will be described.

Figure 10:
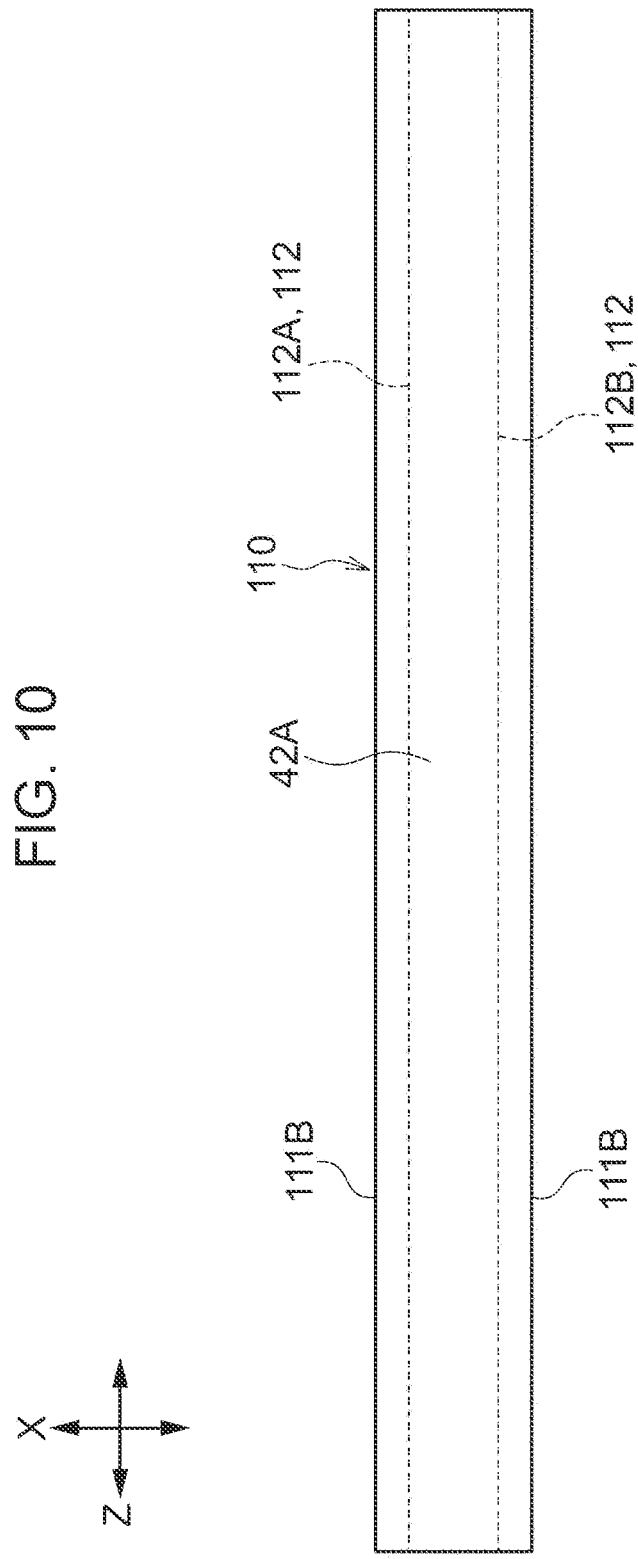
FIG. 10 illustrates a plan view of handles of a base that is included in an exposure device according to a third exemplary embodiment.
Figure 11:
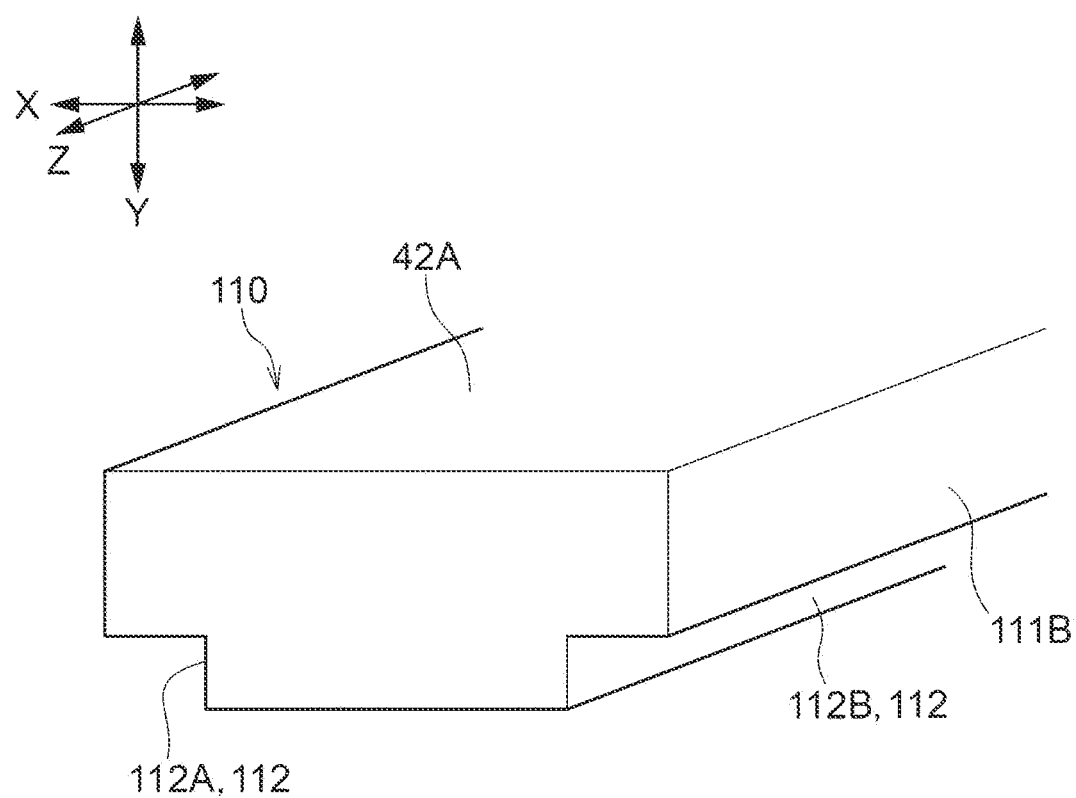
FIG. 11 illustrates a perspective view of the handles of the base that is included in the exposure device according to the third exemplary embodiment.

FIG. 10 and FIG. 11 illustrate a base 110 that is used for the exposure device according to the third exemplary embodiment. As for the exposure device according to the third exemplary embodiment, the difference is only the base 110, and the other structure is the same as that of the exposure device 40 according to the first exemplary embodiment. As illustrated in FIG. 10 and FIG. 11, the base 110 is composed of a metal block that has a rectangular cuboid shape. The base 110 includes handles 112A and 112B that are recessed from a back surface (a surface opposite the front surface 42A) along both edge portions of the base 110 in the transverse direction (the direction of the arrow X). The shapes of the handles 112A and 112B are bilaterally symmetric with each other in the transverse direction (the direction of the arrow X) of the base 42. In the case where it is not necessary to distinguish between the handles 112A and 112B, these are referred to as the handles 112 in some cases.

For example, as for the handles 112, corner portions that extend in the first direction (the direction of the arrow Z) on the back surface are cut along end surfaces 111B of the base 110 in the transverse direction (the direction of the arrow X). That is, the handles 112 are recessed portions that are formed along both sides of the base 110 in the transverse direction (the direction of the arrow X). According to the present exemplary embodiment, the shapes of the handles 112 are rectangular shapes.

The handles 112 are to be held by the operator with the back surface of the base 110 placed on a flat surface. More specifically, the handles 112 have a shape that enables fingers of the operator to catch on the handles, that is, a shape that enables fingers of the operator to be inserted between the flat surface and the handles 112. The handles 112 have a shape that enables fingers of the operator to be inserted from both sides of the base 110 in the transverse direction (the direction of the arrow X).

The exposure device according to the third exemplary embodiment has action and effect described below in addition to action and effect achieved by the same structure as that of the exposure device 40 according to the first exemplary embodiment.

As for the exposure device according to the third exemplary embodiment, the handles 112 (that is, the handles 112A and 112B) may be more easily formed than the case where a projecting portion that projects from both sides of a base in the transverse direction is provided.

As for the exposure device according to the third exemplary embodiment, the base 110 may be more easily lifted than the case where fingers of the operator are inserted from a side of the base 110 in the transverse direction, and fingers are subsequently inserted from the other. For example, one of two operators inserts fingers into the handle 112A, and the other of the two operators inserts fingers into the handles 112B. In this way, the base 110 may be easy to lift.

Fourth Exemplary Embodiment

An exposure device according to a fourth exemplary embodiment will now be described. A basic structure of the exposure device according to the fourth exemplary embodiment is the same as that of the exposure device 40 according to the first exemplary embodiment. Components and members according to the fourth exemplary embodiment like to those according to the first exemplary embodiment, for example, are designated like reference characters, the detailed description thereof is omitted, and a difference therebetween will be described.

Figure 12:
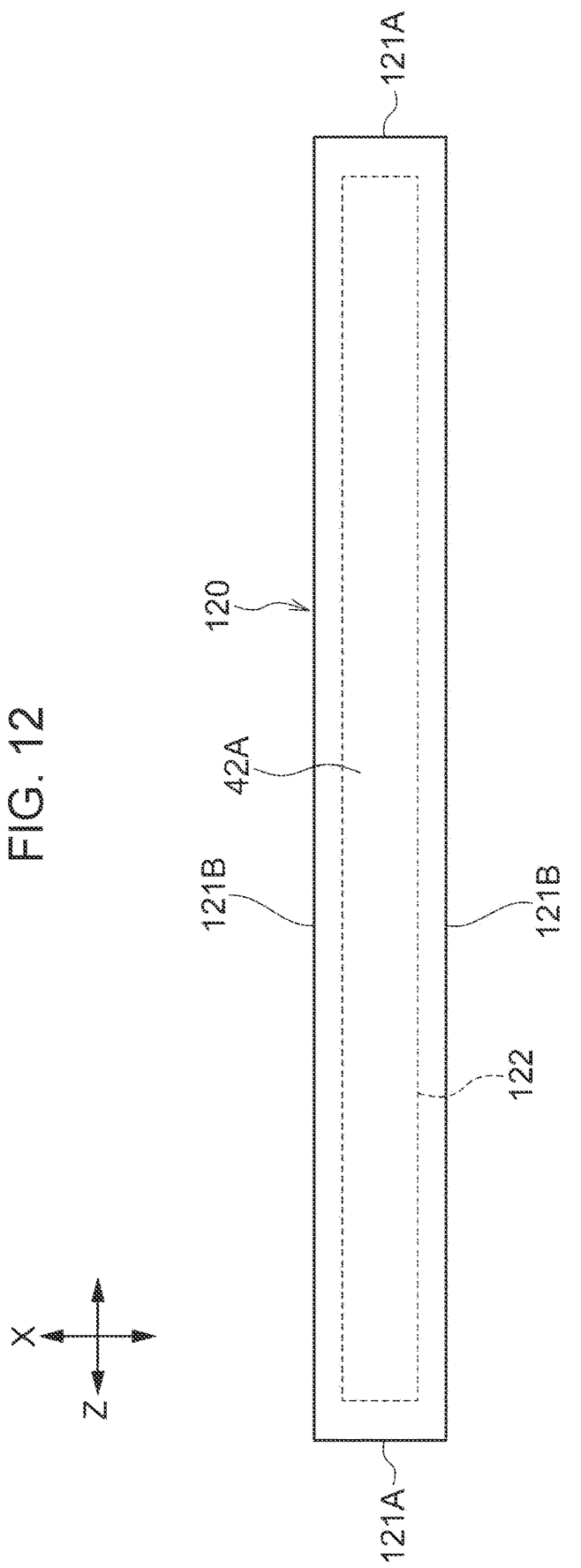
FIG. 12 illustrates a plan view of a handle of a base that is included in an exposure device according to according to a fourth exemplary embodiment.
Figure 13:
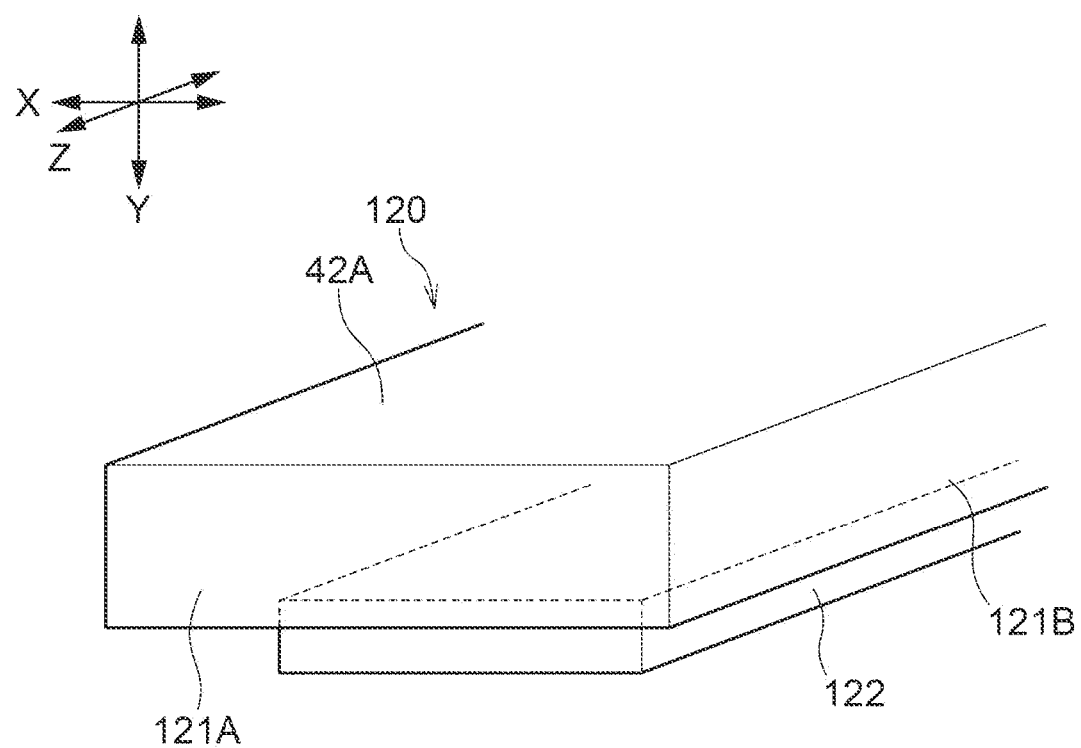
FIG. 13 illustrates a perspective view of the handle of the base that is included in the exposure device according to the fourth exemplary embodiment.

FIG. 12 and FIG. 13 illustrate a base 120 that is used for the exposure device according to the fourth exemplary embodiment. As for the exposure device according to the fourth exemplary embodiment, the difference is only the base 120, and the other structure is the same as that of the exposure device 40 according to the first exemplary embodiment. As illustrated in FIG. 12 and FIG. 13, the base 120 is composed of a metal block that has a rectangular cuboid shape. The base 120 includes a handle 122 that is recessed from a back surface (a surface opposite the front surface 42A) along four edge portions of the base 120.

For example, as for the handle 122, corner portions that extend in the transverse direction (the direction of the arrow X) on the back surface are cut along end surfaces 121A of the base 120 in the first direction (the direction of the arrow Z). As for the handle 122, corner portions that extend in the first direction (the direction of the arrow Z) on the back surface are cut along end surfaces 121B of the base 120 in the transverse direction (the direction of the arrow X). The handle 122 is a recessed portion that is continuously formed along the four end surfaces 121A and 121B of the base 120. According to the present exemplary embodiment, the shape of the handle 122 is a rectangular shape.

The handle 122 is to be held by the operator with the back surface of the base 120 placed on a flat surface. More specifically, the handle 122 has a shape that enables fingers of the operator to catch on the handle, that is, a shape that enables fingers of the operator to be inserted between the flat surface and the handle 122. The handle 122 has a shape that enables fingers of the operator to be inserted from both sides of the base 120 in the transverse direction (the direction of the arrow X).

The exposure device according to the fourth exemplary embodiment has action and effect described below in addition to action and effect achieved by the same structure as those of the exposure devices according to the first to third exemplary embodiments.

As for the exposure device according to the fourth exemplary embodiment, the handle 122 may be more easily formed than the case where a projecting portion that projects from both ends of a base in the first direction or both sides of the base in the transverse direction is provided.

As for the exposure device according to the fourth exemplary embodiment, the base 120 may be more easily lifted than the case where fingers of the operator are inserted from an end of the base 120 in the first direction or a side of the base 120 in the transverse direction, and fingers are subsequently inserted from the other. For example, one of two operators inserts fingers into the handle 122, and the other of the two operators inserts fingers into the handle 122. In this way, the base 120 may be easy to lift.

Fifth Exemplary Embodiment

An exposure device according to a fifth exemplary embodiment will now be described. A basic structure of the exposure device according to the fifth exemplary embodiment is the same as that of the exposure device 40 according to the first exemplary embodiment. Components and members according to the fifth exemplary embodiment like to those according to the first exemplary embodiment, for example, are designated like reference characters, the detailed description thereof is omitted, and a difference therebetween will be described.

Figure 14:
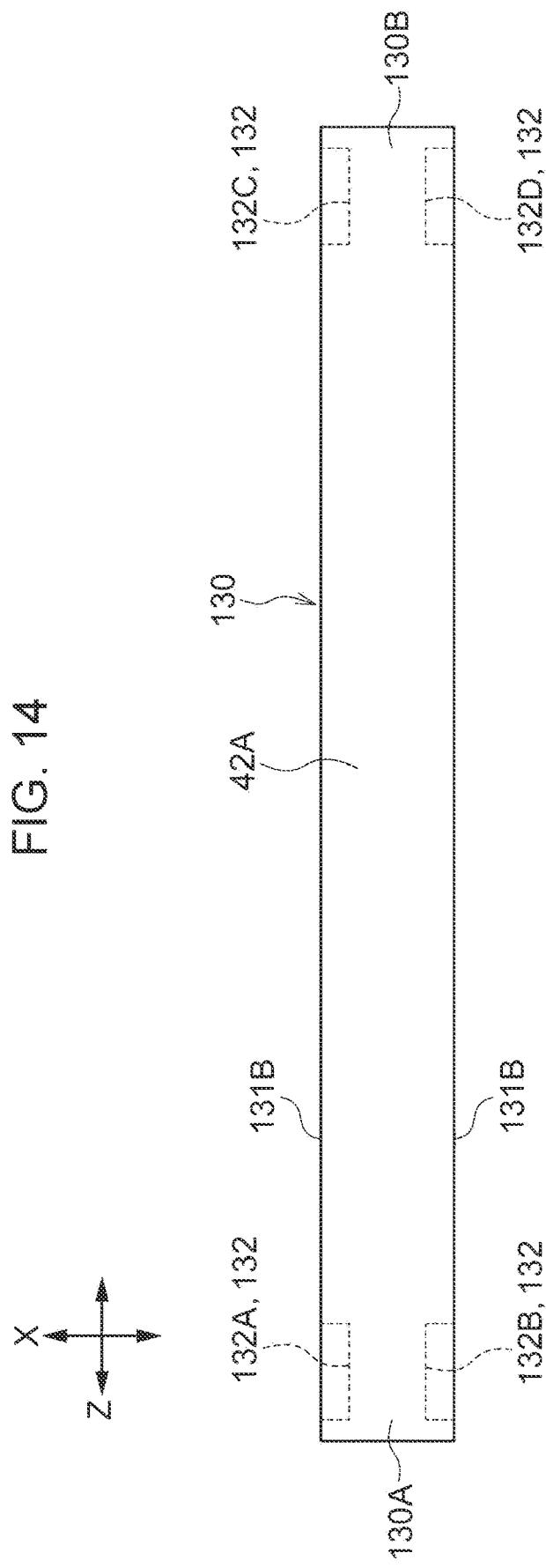
FIG. 14 illustrates a plan view of handles of a base that is included in an exposure device according to according to a fifth exemplary embodiment.
Figure 15:
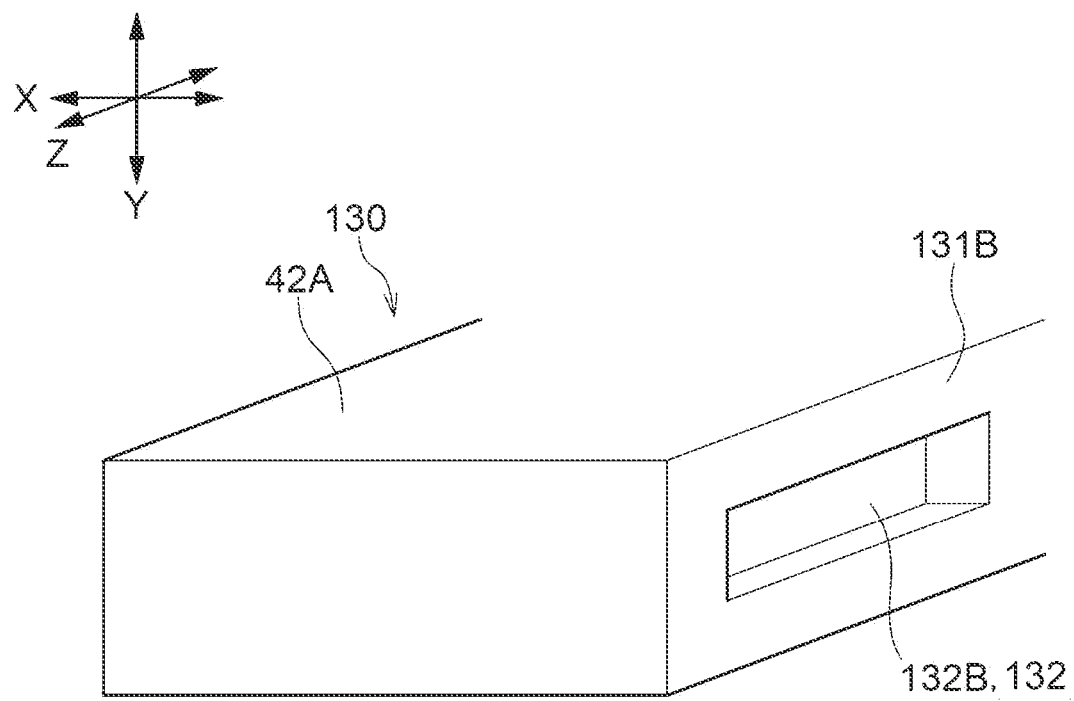
FIG. 15 illustrates a perspective view of one of the handles of the base that is included in the exposure device according to the fifth exemplary embodiment.

FIG. 14 and FIG. 15 illustrate a base 130 that is used for the exposure device according to the fifth exemplary embodiment. As for the exposure device according to the fifth exemplary embodiment, the difference is only the base 130, and the other structure is the same as that of the exposure device 40 according to the first exemplary embodiment. As illustrated in FIG. 14 and FIG. 15, the base 130 is composed of a metal block that has a rectangular cuboid shape. The base 130 includes handles 132A and 132B that are formed on both end surfaces 131B of the base 130 in the transverse direction (the direction of the arrow X) at an end portion 130A in the first direction (the direction of the arrow Z). The base 130 includes handles 132C and 132D that are formed on both end surfaces 131B of the base 130 in the transverse direction (the direction of the arrow X) at another end portion 130B in the first direction (the direction of the arrow Z) (see FIG. 14). The end surfaces 131B are examples of a side surface. In the case where it is not necessary to distinguish among the handles 132A, 132B, 132C, and 132D, these are referred to as the handles 132 in some cases.

The handles 132A, 132B, 132C, and 132D have the same shape and are recessed portions that are recessed from the end surfaces 131B of the base 130. The handles 132 are disposed below the front surface 42A of the base 130 in the up-down direction (the direction of the arrow Y). According to the present exemplary embodiment, the shapes of the handles 132 are rectangular shapes. The handles 132 are to be held by the operator with the back surface of the base 130 placed on a flat surface. The handles 132 have a shape that enables fingers of the operator to catch on the handles, that is, a shape that enables fingers of the operator to be inserted between the flat surface and the handles 132.

The exposure device according to the fifth exemplary embodiment has action and effect described below in addition to action and effect achieved by the same structure as those of the exposure devices according to the first to fourth exemplary embodiments.

As for the exposure device according to the fifth exemplary embodiment, an area that is occupied by the base 130 that includes the handles 132 is smaller than that in the case where a projecting portion that projects from a side surface of a base is provided.

Sixth Exemplary Embodiment

An exposure device according to a sixth exemplary embodiment will now be described. A basic structure of the exposure device according to the sixth exemplary embodiment is the same as that of the exposure device 40 according to the first exemplary embodiment. Components and members according to the sixth exemplary embodiment like to those according to the first exemplary embodiment, for example, are designated like reference characters, the detailed description thereof is omitted, and a difference therebetween will be described.

Figure 16:
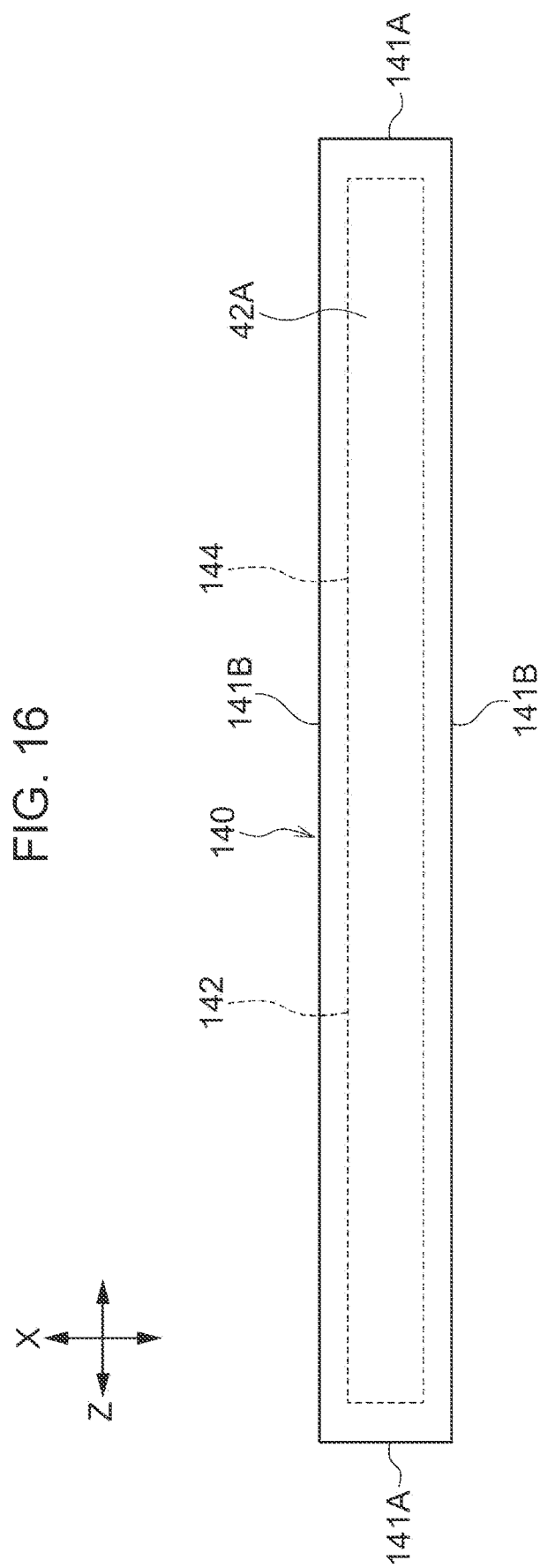
FIG. 16 illustrates a plan view of a handle of a base that is included in an exposure device according to a sixth exemplary embodiment.
Figure 17:
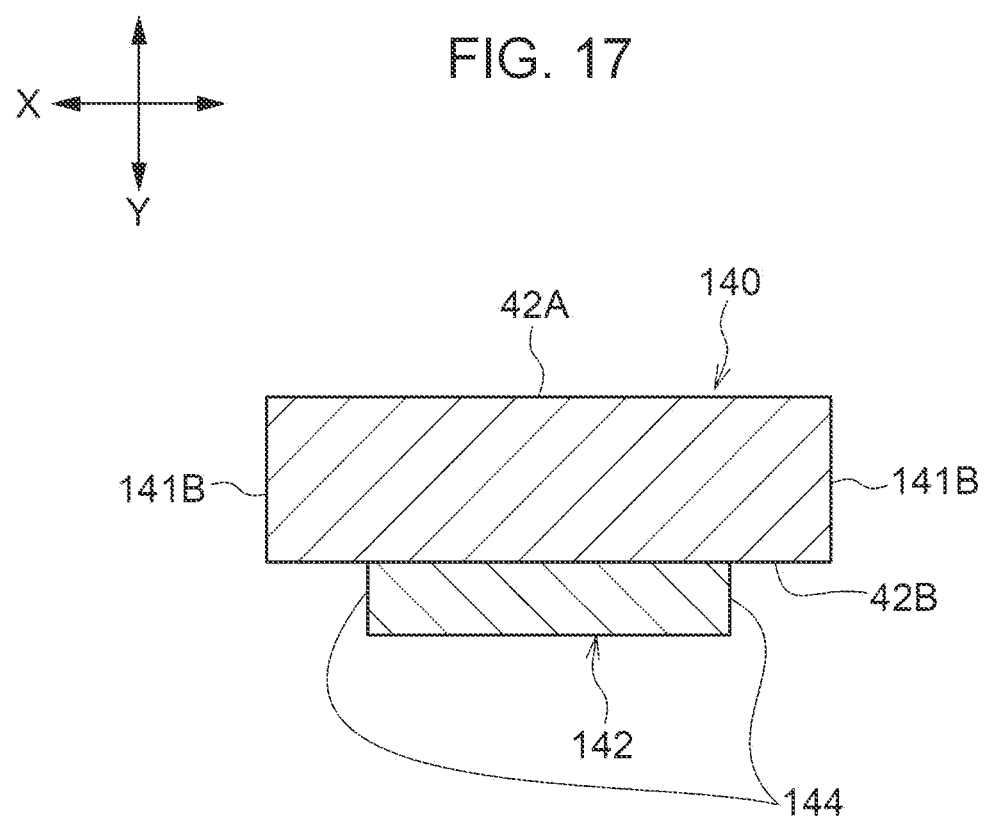
FIG. 17 illustrates a sectional view of the handle of the base that is included in the exposure device according to the sixth exemplary embodiment taken in a transverse direction.

FIG. 16 and FIG. 17 illustrate a base 140 and an additional member 142 that are used for the exposure device according to the sixth exemplary embodiment. As for the exposure device according to the sixth exemplary embodiment, the difference is only the base 140 and the additional member 142, and the other structure is the same as that of the exposure device 40 according to the first exemplary embodiment. As illustrated in FIG. 16 and FIG. 17, the base 140 is composed of a metal block that has a rectangular cuboid shape. The additional member 142 that has an area smaller than the area of the base 140 in a plan view is fixed to a portion of the back surface 42B of the base 140 except for a circumferential portion. The additional member 142 is a plate that has a rectangular shape in a plan view. Consequently, a handle 144 is formed so as to be adjacent to the additional member 142 on the back surface 42B of the base 140.

According to the present exemplary embodiment, the additional member 142 is composed of metal and is fixed to the base 140 by, for example, welding, sticking, screwing, or fitting. The handle 144 is continuously formed along the four end surfaces 141A and 141B of the base 140. According to the present exemplary embodiment, a section of the handle 144 has a rectangular shape.

The handle 144 is to be held by the operator with the base 140 (that is, the additional member 142) placed on a flat surface. More specifically, the handle 144 have a shape that enables fingers of the operator to catch on the handle, that is, a shape that enables fingers to be inserted between the flat surface and the handle 144. The handle 144 has a shape that enables fingers of the operator to be inserted from both sides of the base 140 in the transverse direction (the direction of the arrow X).

The exposure device according to the sixth exemplary embodiment has action and effect described below in addition to action and effect achieved by the same structure as those of the exposure devices according to the first to fourth exemplary embodiments.

As for the exposure device according to the sixth exemplary embodiment, the base itself includes no handle, and the handle 144 may be formed by the additional member 142 that differs from the base 140.

Seventh Exemplary Embodiment

An exposure device according to a seventh exemplary embodiment will now be described. A basic structure of the exposure device according to the seventh exemplary embodiment is the same as that of the exposure device 40 according to the first exemplary embodiment. Components and members according to the seventh exemplary embodiment like to those according to the first exemplary embodiment, for example, are designated like reference characters, the detailed description thereof is omitted, and a difference therebetween will be described.

Figure 18:
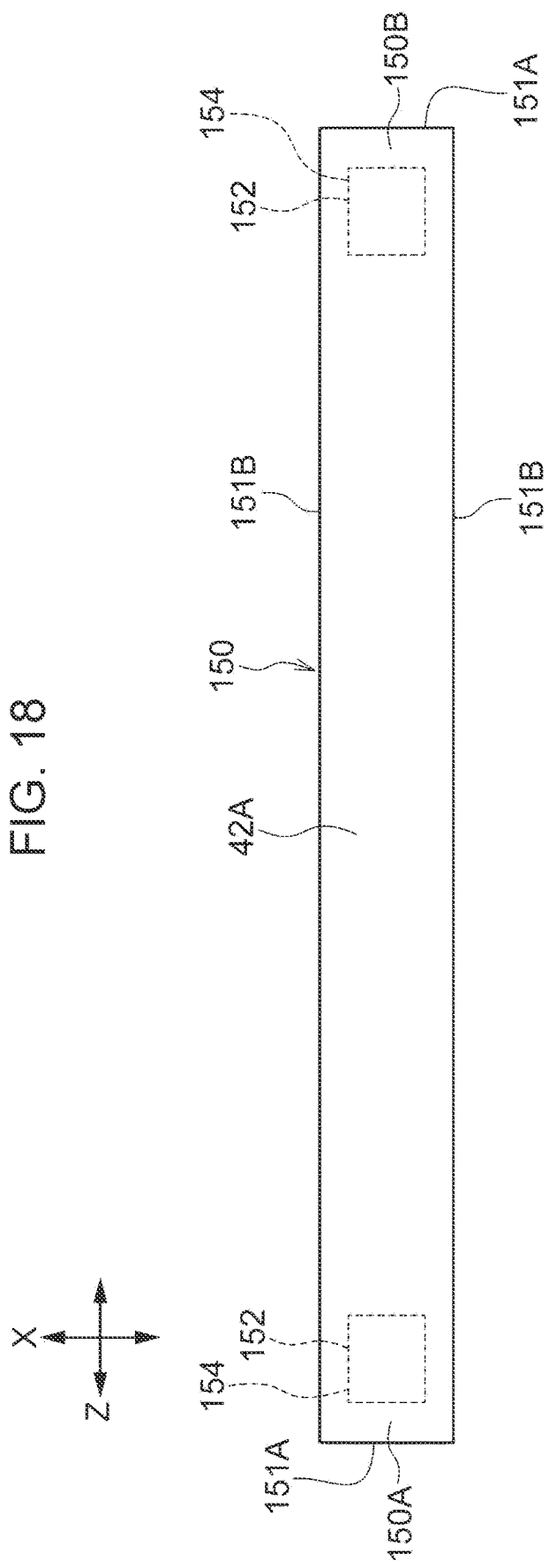
FIG. 18 illustrates a plan view of handles of a base that is included in an exposure device according to a seventh exemplary embodiment.

FIG. 18 and FIG. 19 illustrate a base 150 and multiple additional members 152 that are used for the exposure device according to the seventh exemplary embodiment. As for the exposure device according to the seventh exemplary embodiment, the difference is only the base 150 and the multiple additional members 152, and the other structure is the same as that of the exposure device 40 according to the first exemplary embodiment. As illustrated in FIG. 18 and FIG. 19, the base 150 is composed of a metal block that has a rectangular cuboid shape. The multiple (two according to the present exemplary embodiment) additional members 152 that have an area smaller than the area of the base 150 in a plan view are fixed to the back surface 42B of the base 150 at both end portions in the first direction (the direction of the arrow Z). That is, the two additional members 152 are separately disposed on the base 150. The additional members 152 are plates that have a square shape in a plan view. Consequently, handles 154 are formed so as to be adjacent to the two additional members 152 on the back surface 42B of the base 150. The handles 154 are formed at both end portions of the base 150 in the first direction (the direction of the arrow Z).

More specifically, at an end portion 150A of the base 150 in the first direction (the direction of the arrow Z), one of the handles 154 is continuously formed so as to be adjacent to one of the additional members 152 along an end surface 151A of the base 150 in the first direction and both end surfaces 151B of the base 150 in the transverse direction (the direction of the arrow X). At another end portion 150B of the base 150 in the first direction (the direction of the arrow Z), the other handle 154 is continuously formed so as to be adjacent to the other additional member 152 along the other end surface 151A of the base 150 in the first direction and both end surfaces 151B of the base 150 in the transverse direction (the direction of the arrow X).

According to the present exemplary embodiment, the additional members 152 are composed of metal and are fixed to the base 150 by, for example, welding, sticking, screwing, or fitting. According to the present exemplary embodiment, a section of each handle 154 has a rectangular shape.

The handles 154 are to be held by the operator with the additional members 152 of the base 150 placed on a flat surface. More specifically, the handles 154 have a shape that enables fingers of the operator to catch on the handles, that is, a shape that enables fingers of the operator to be inserted between the flat surface and the handles 154. The handles 154 have a shape that enables fingers of the operator to be inserted from both sides of the base 150 in the transverse direction (the direction of the arrow X).

The exposure device according to the seventh exemplary embodiment has action and effect described below in addition to action and effect achieved by the same structure as those of the exposure device according to the sixth exemplary embodiment.

As for the exposure device according to the seventh exemplary embodiment, the additional members 152 are disposed at both end portions of the base 150 in the first direction. For this reason, this is more stable when the additional members 152 of the base 150 are placed on a flat surface than the case where an additional member is disposed on a central portion of a base in the first direction.

As for the exposure device of seventh exemplary embodiment, the multiple additional members 152 are separately disposed on the base 150. In this way, the material of the additional members 152 may be reduced unlike the case where a single large additional member is disposed on a base.

As for the exposure devices according to the sixth and seventh exemplary embodiments, the additional members 142 and 152 may be composed of resin instead of metal. An additional member that is composed of resin may be fixed to the base by, for example, sticking, screwing, or fitting. In this way, the weight of the exposure devices may be reduced unlike the case where an additional member is composed of metal.

Eighth Exemplary Embodiment

An exposure device according to an eighth exemplary embodiment will now be described. A basic structure of the exposure device according to the eighth exemplary embodiment is the same as that of the exposure device 40 according to the first exemplary embodiment. Components and members according to the eighth exemplary embodiment like to those according to the first exemplary embodiment, for example, are designated like reference characters, the detailed description thereof is omitted, and a difference therebetween will be described.

Figure 20:
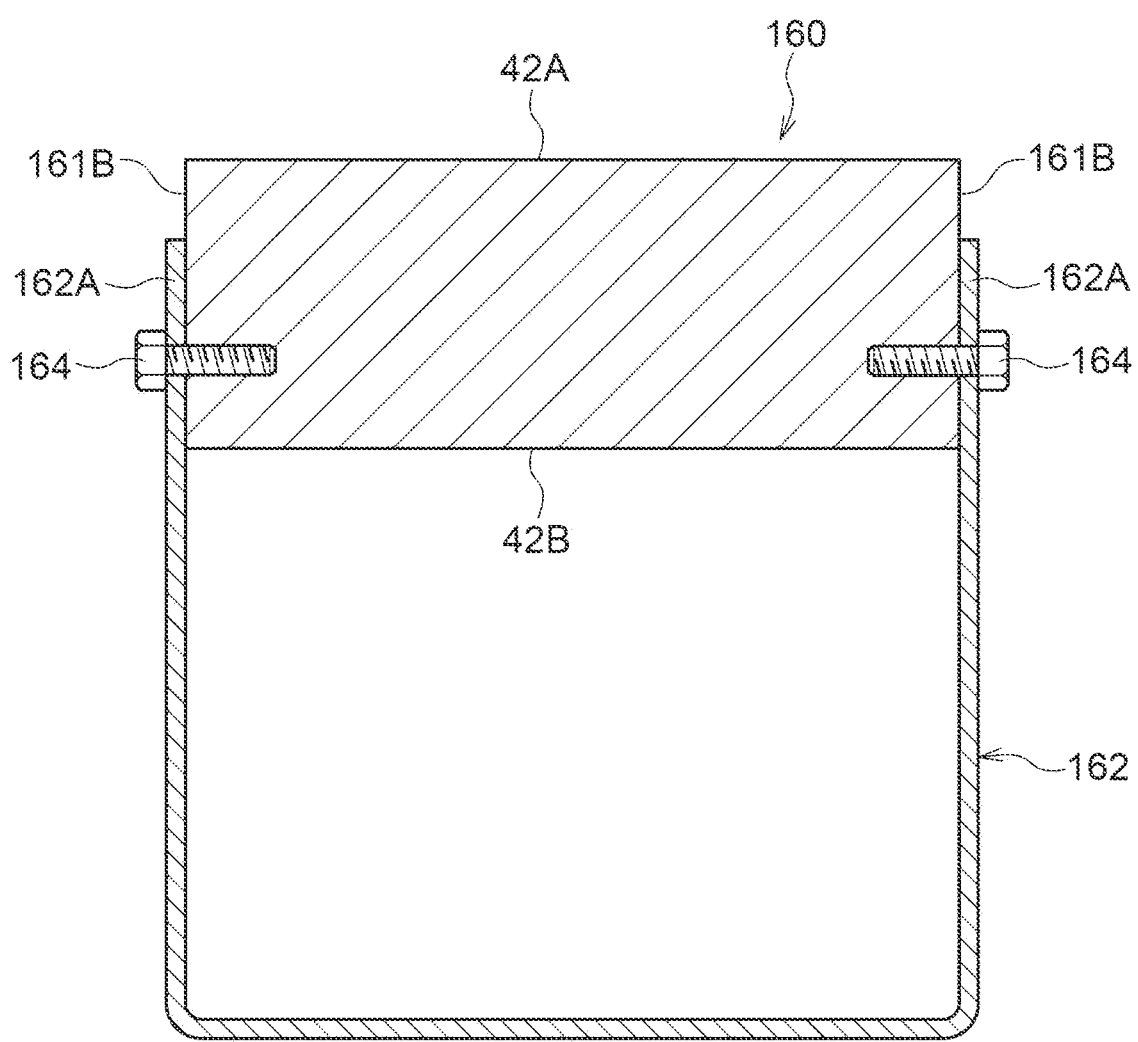
FIG. 20 illustrates a sectional view of a base and a covering that are included in an exposure device according to an eighth exemplary embodiment taken in the transverse direction.
Figure 21:
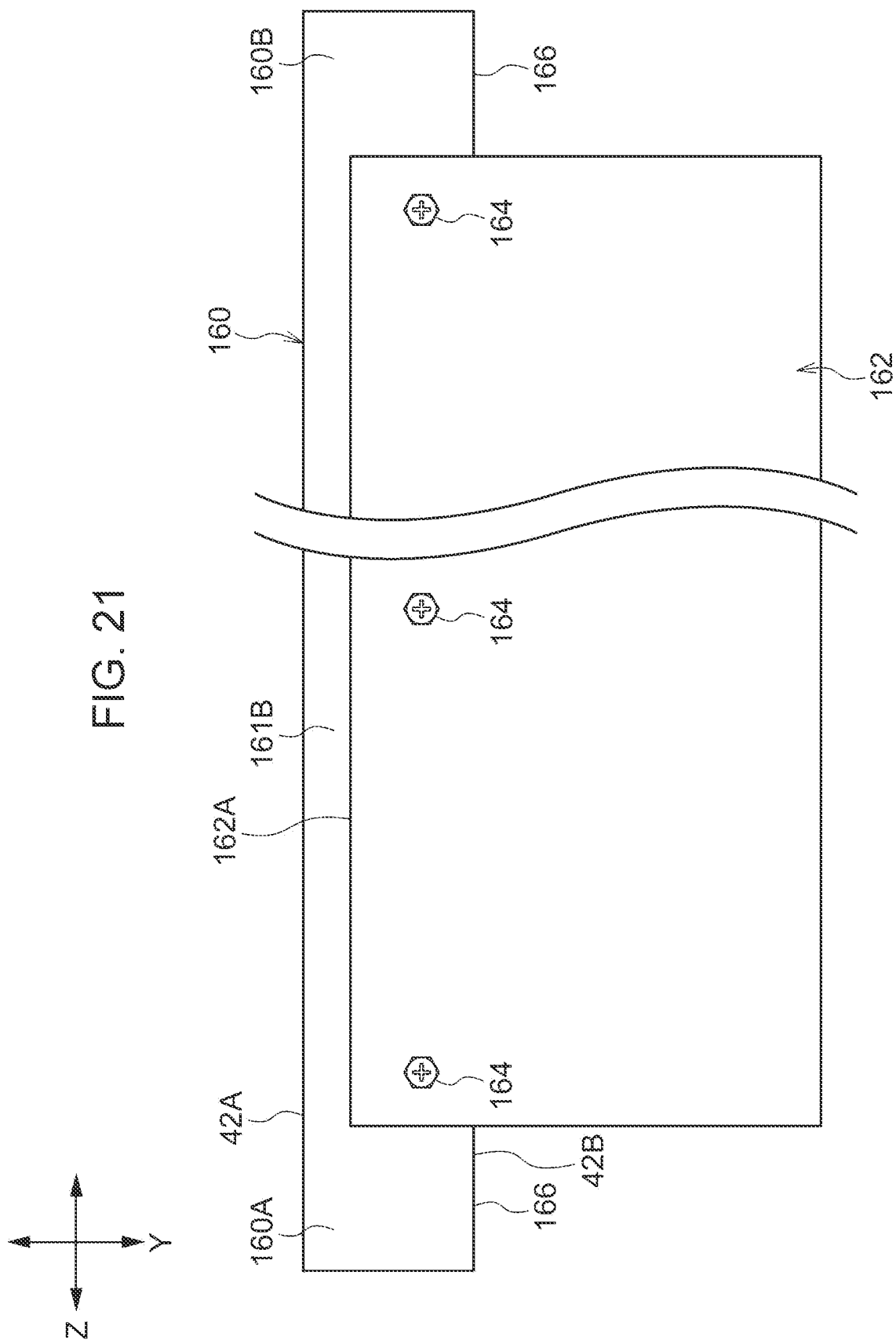
FIG. 21 illustrates a side view of handles of the base that is included in the exposure device according to the eighth exemplary embodiment.

FIG. 20 and FIG. 21 illustrate a base 160 and a lower covering 162 that are used for the exposure device according to the eighth exemplary embodiment. As for the exposure device according to the eighth exemplary embodiment, the difference is only the base 160 and the lower covering 162, and the other structure is the same as that of the exposure device 40 according to the first exemplary embodiment. As illustrated in FIG. 20 and FIG. 21, the base 160 is composed of a metal block that has a rectangular cuboid shape, and the back surface 42B of the base 160 is flat. The lower covering 162 that projects to a position below the base 160 in the up-down direction (the direction of the arrow Y) and that covers a part of the back surface 42B of the base 160 is mounted on the base 160. The lower covering 162 is an example of the mount portion. The lower covering 162 has a U-shape that opens to the base 160 in a sectional view in the transverse direction. An upper edge portion 162A of the lower covering 162 is mounted on both end surfaces (that is, side surfaces) 161B of the base 160 in the transverse direction (the direction of the arrow X) by using multiple fasteners 164. According to the present exemplary embodiment, the lower covering 162 has the function of a covering that covers harnesses (not illustrated) that are connected to multiple light-emitting portions (not illustrated).

The length of the lower covering 162 in the first direction (the direction of the arrow Z) is shorter than the length of the base 160 in the first direction (the direction of the arrow Z). That is, the area of the lower covering 162 is smaller than the area of the base 160 when viewed from the back surface 42B of the base 160. According to the present exemplary embodiment, the area of the lower covering 162 is equal to the area of a portion of the lower covering 162 that projects from the base 160. Consequently, handles 166 are formed so as to be adjacent to the lower covering 162 on the back surface 42B of the base 160 at an end portion 160A and another end portion 160B of the base 160 in the first direction (the direction of the arrow Z).

The exposure device according to the eighth exemplary embodiment has action and effect described below in addition to action and effect achieved by the same structure as those of the exposure devices according to the first to seventh exemplary embodiments.

As for the exposure device according to the eighth exemplary embodiment, the base itself includes no handle, and the handles 166 may be formed by the lower covering 162 that differs from the base 160.

As for the exposure device according to the eighth exemplary embodiment, the handles 166 are formed at both end portions of the base 160 in the first direction. In this way, the handles 166 may be more easily formed than the case where a projecting portion that projects in the first direction of a base is provided.

As for the exposure device according to the eighth exemplary embodiment, the lower covering 162 includes a covering that covers harnesses (not illustrated) that are connected to multiple light-emitting portions (not illustrated). In this way, the handles 166 may be formed by using the lower covering 162 that covers the harnesses unlike the case where a base includes an exclusive mount member.

Ninth Exemplary Embodiment

An exposure device according to a ninth exemplary embodiment will now be described. A basic structure of the exposure device according to the ninth exemplary embodiment is the same as that of the exposure device 40 according to the first exemplary embodiment. Components and members according to the ninth exemplary embodiment like to those according to the first exemplary embodiment, for example, are designated like reference characters, the detailed description thereof is omitted, and a difference therebetween will be described.

Figure 22:
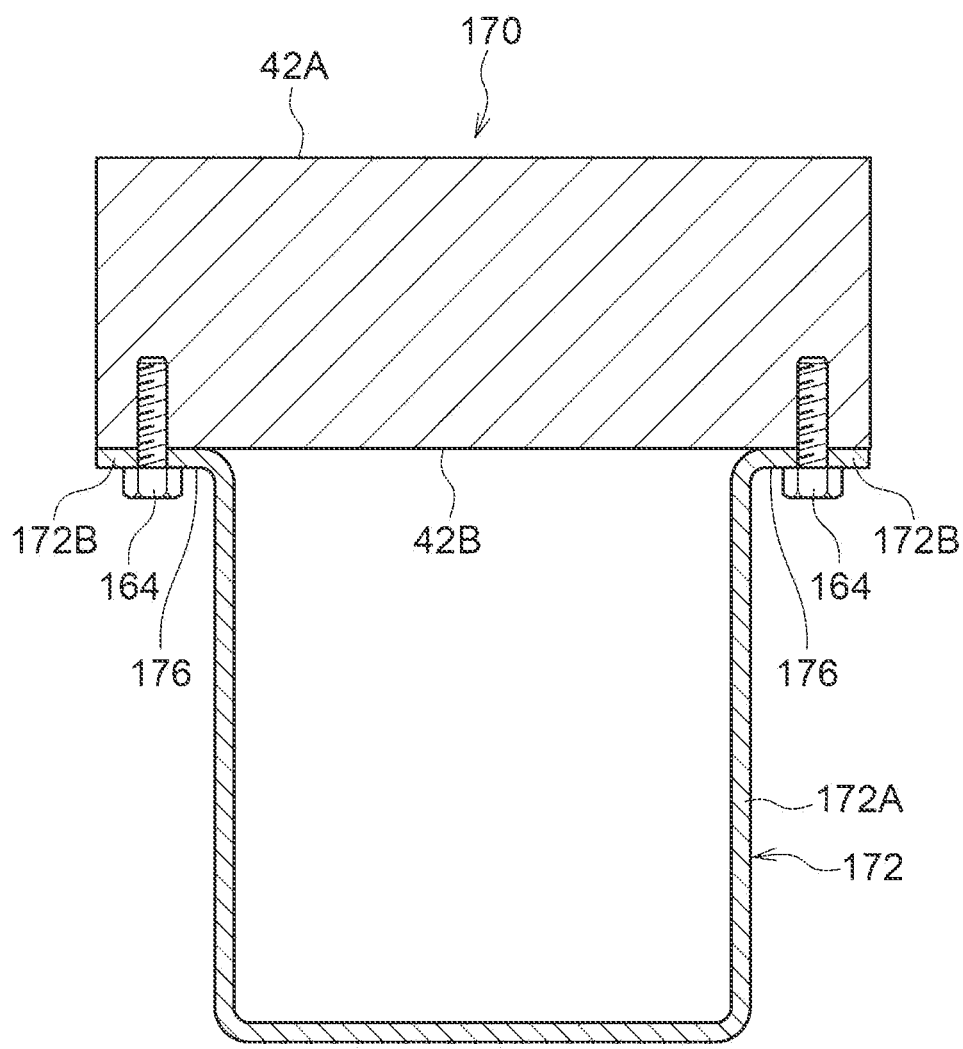
FIG. 22 illustrates a sectional view of a base and a covering that are included in an exposure device according to a ninth exemplary embodiment exposure device taken in the transverse direction.
Figure 23:
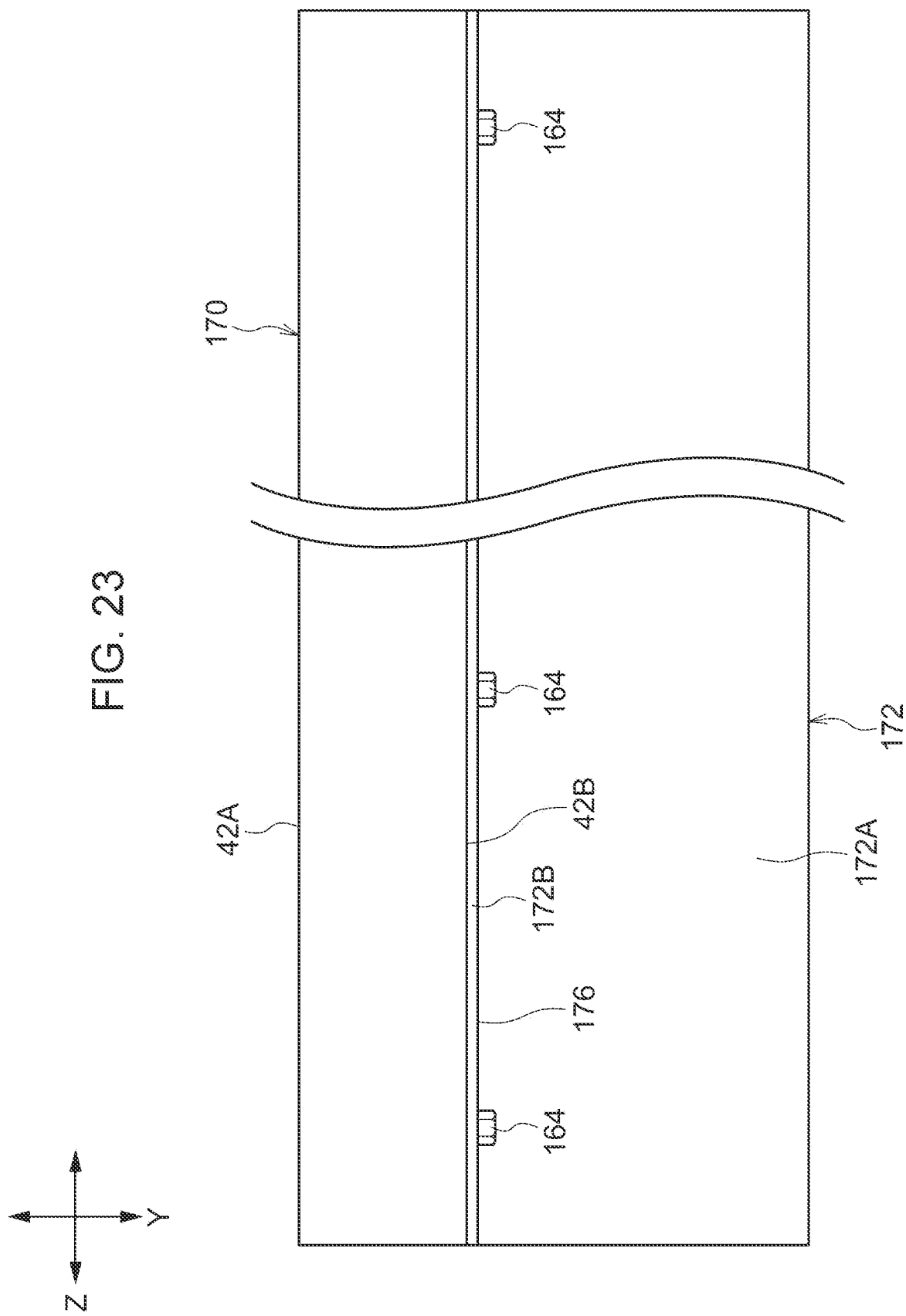
FIG. 23 illustrates a side view of the base and the covering that are included in the exposure device according to the ninth exemplary embodiment.

FIG. 22 and FIG. 23 illustrate a base 170 and a lower covering 172 that are used for the exposure device according to the ninth exemplary embodiment. As for the exposure device according to the ninth exemplary embodiment, the difference is only the base 170 and the lower covering 172, and the other structure is the same as that of the exposure device 40 according to the first exemplary embodiment. As illustrated in FIG. 22 and FIG. 23, the base 170 is composed of a metal block that has a rectangular cuboid shape, and the back surface 42B of the base 170 is flat. The lower covering 172 that projects to a position below the base 170 in the up-down direction (the direction of the arrow Y) and that covers a part of the back surface 42B of the base 170 is mounted on the back surface 42B of the base 170. The lower covering 172 is an example of the mount portion.

The length of the lower covering 172 in the first direction (the direction of the arrow Z) is equal to the length of the base 170 in the first direction (the direction of the arrow Z). The lower covering 172 has a shape of a hat in a sectional view in the transverse direction. More specifically, the lower covering 172 includes a projecting portion 172A that projects downward from the base 170, that opens to the base 170, and that has a U-shape and flange portions 172B that bend from upper end portions of the projecting portion 172A toward both sides. The area of the projecting portion 172A of the lower covering 172 is smaller than the area of the base 170 when viewed from the back surface 42B of the base 170. The flange portions 172B of the lower covering 172 are in contact with the back surface 42B of the base 170. In this state, the flange portions 172B are mounted on the back surface 42B of the base 170 by using the multiple fasteners 164. According to the present exemplary embodiment, the lower covering 172 has the function of a covering that covers harnesses (not illustrated) that are connected to multiple light-emitting portions (not illustrated).

According to the present exemplary embodiment, the area of the projecting portion 172A of the lower covering 172 is smaller than the area of the base 170, and handles 176 are formed so as to be adjacent to the projecting portion 172A on the back surface 42B of the base 170. That is, the flange portions 172B of the lower covering 172 are in contact with the back surface 42B of the base 170 along both sides of the base 170 in the transverse direction (the direction of the arrow X). The handles 176 are lower parts of the flange portions 172B.

The exposure device according to the ninth exemplary embodiment has action and effect described below in addition to action and effect achieved by the same structure as those of the exposure device according to the eighth exemplary embodiment.

As for the exposure device according to the ninth exemplary embodiment, the projecting portion 172A of the lower covering 172 has an area smaller than the area of the base 170 when viewed from the back surface 42B of the base 170, and the handles 176 are formed so as to be adjacent to the projecting portion 172A on the back surface 42B of the base 170. In this way, the base itself includes no handle, and the handles 176 may be formed by the lower covering 172 that differs from the base 170.

As for the exposure device according to the ninth exemplary embodiment, the handles 176 may be more easily formed than the case where a projecting portion that projects in the transverse direction of a base is provided.

As for the exposure devices according to the eighth and ninth exemplary embodiments, the lower coverings 162 and 172 may be ducts that have flow paths on which air flows in the first direction of the bases. For example, a fan for supplying air may be provided on an end of each duct in the first direction, and each base may have an opening for blowing air from the duct in the up-down direction toward the light-emitting portions. With this structure, the duct may be used to form a handle unlike the case a base includes an exclusive mount member. The lower coverings 162 and 172 may serve as the ducts that have flow paths on which air flows in the first direction of the bases and as coverings that protect the harnesses. In comparison between the eighth exemplary embodiment and the ninth exemplary embodiment, the eighth exemplary embodiment in which the lower covering is wide is unlikely to cause a fall. For this reason, from the perspective of inhibition against a fall, the eighth exemplary embodiment may be used particularly for a structure in which the base is composed of a metal block and is heavy. Similarly, in comparison between the first and second exemplary embodiments and the third and fourth exemplary embodiments, from the perspective of inhibition against a fall, the first and second exemplary embodiments may be used.

Tenth Exemplary Embodiment

Figure 24:
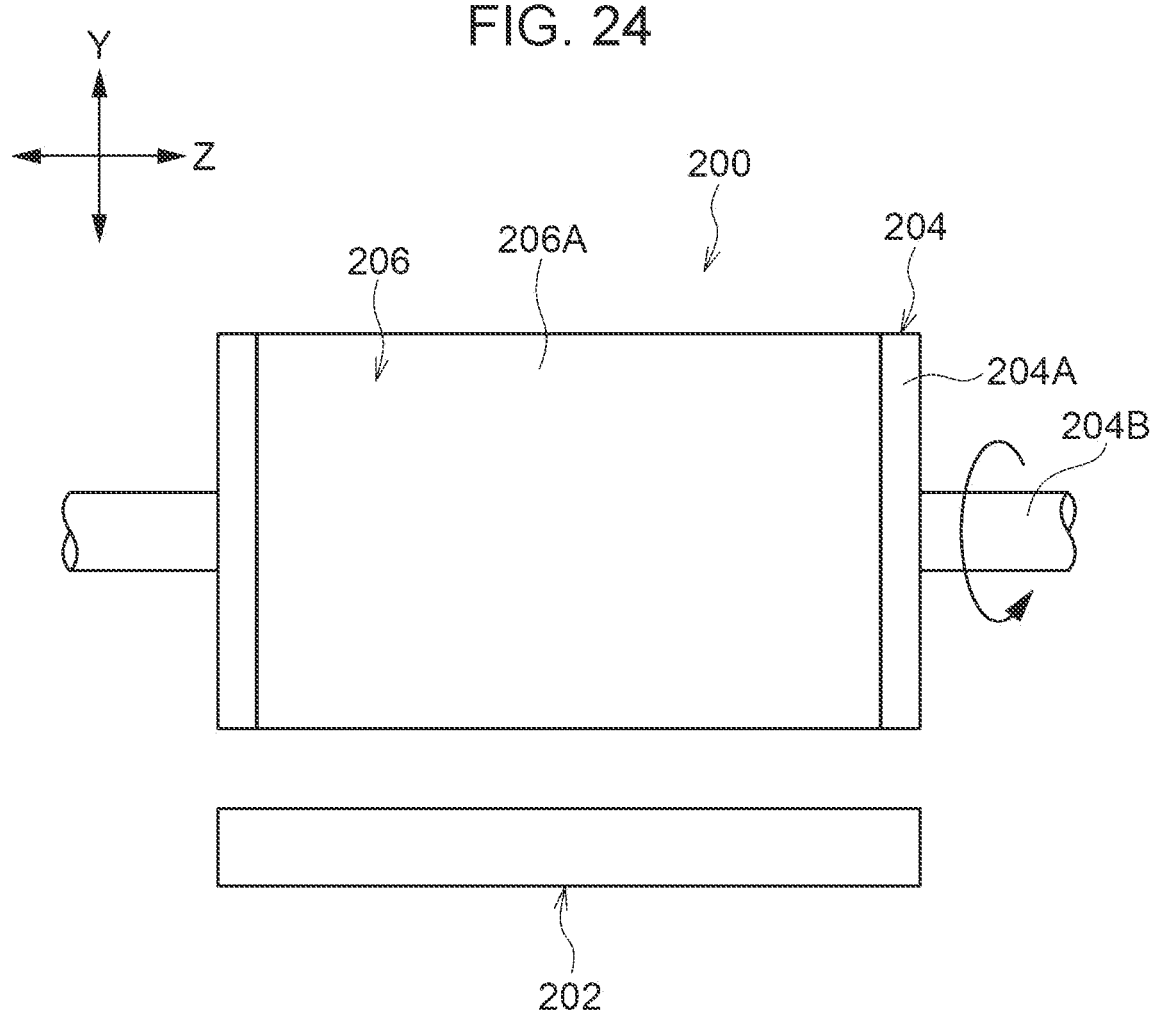
FIG. 24 illustrates the structure of a drawing apparatus that includes a light-emitting device according to a tenth exemplary embodiment.

FIG. 24 illustrates a drawing apparatus 200 that includes a light-emitting device 202 according to a tenth exemplary embodiment. Components like to those according to the first exemplary embodiment described above are designated by like numbers, and the description thereof is omitted.

As illustrated in FIG. 24, the drawing apparatus 200 includes the light-emitting device 202 and a cylindrical member 204 that is arranged in the longitudinal direction of the light-emitting device 202 and that rotates in a circumferential direction.

The light-emitting device 202 has the same structure as that of the exposure device 40 according to the first exemplary embodiment.

The cylindrical member 204 includes a cylindrical portion 204A and a head 204B that extends from both sides of the cylindrical portion 204A. The head 204B is rotatably supported by a frame, not illustrated. With a result that the head 204B rotates, the cylindrical portion 204A rotates in the circumferential direction.

A substrate 206 is mounted on a surface of the cylindrical portion 204A. A surface of the substrate 206 has a region 206A in which a photoconductive material is disposed. An example of the substrate 206 is a plate for computer-to-plate (CTP) that is used in a printmaking process of offset printing. An example of the region 206A in which the photoconductive material is disposed is a region to which a photoconductive material such as photoresist is applied.

As for the drawing apparatus 200, light in a predetermined pattern is radiated from the light-emitting device 202 to the region 206A of the substrate 206 in which the photoconductive material is disposed while the cylindrical member 204 is rotated. Consequently, the predetermined pattern is drawn in the region 206A of the substrate 206 in which the photoconductive material is disposed. Subsequently, the substrate 206 is developed, and a printing plate that is used for an offset printer is consequently manufactured. In this case, an example of a light source for the drawing apparatus 200 may be a laser element.

The light-emitting device 202 described above has action and effect described below in addition to action and effect achieved by the same structure as those of the exposure device 40 according to the first exemplary embodiment.

As for the drawing apparatus 200, the light-emitting device 202 may have the same structure as that of any one of the exposure devices according to the second to ninth exemplary embodiments instead of the structure of the exposure device 40 according to the first exemplary embodiment.

Supplementary Description

As for the exposure devices according to the first to ninth exemplary embodiments and the light-emitting device according to the tenth exemplary embodiment, each base includes the three light-emitting portions. The present disclosure, however, is not limited to these structures. For example, the base may include a single light-emitting portion, the base may include two light-emitting portions, or the base may include four or more light-emitting portions. The positions of the multiple light-emitting portions that are included in the base may be appropriately determined.

As for the exposure devices according to the first to ninth exemplary embodiments and the light-emitting device according to the tenth exemplary embodiment, the shape of each base may be changed. The components of the light-emitting portions or the shapes of the components of the light-emitting portions may be changed. Each support 60 of the light-emitting portions is composed of a metal block. The present disclosure, however, is not limited thereto. For example, the support may be composed of resin or another metal material such as a metal plate.

As for the exposure devices according to the first to ninth exemplary embodiments and the light-emitting device according to the tenth exemplary embodiment, the shape, position, number of each handle may be changed. For example, a handle may be formed only along an end of the base in the first direction or a side of the base in the transverse direction. A handle may be formed along an end of the base in the first direction or a side of the base in the transverse direction, and a grip portion that projects upward or sideways from the base may be formed along the other end of the base in the first direction or the other side of the base in the transverse direction. A handle may be formed by using a rib that is disposed on the base in order to improve the flexural rigidity of the base. According to the sixth and seventh exemplary embodiments, each additional member that has a plate shape is fixed to the base. The additional member, however, is not limited by a plate shape. For example, an additional member obtained by folding a metal plate may be used.

As for the drawing apparatus 200 according to the tenth exemplary embodiment, light is radiated from the light-emitting device 202 to the substrate 206 that is mounted on the cylindrical portion 204A of the cylindrical member 204. The present disclosure, however, is not limited to this structure. For example, the substrate may be disposed on a table that has a flat plate shape, the light-emitting device and the table may be relatively moved in a direction that intersects the first direction of the light-emitting device, and light may be radiated from the light-emitting device to the substrate.

As for the drawing apparatus 200 according to the tenth exemplary embodiment, the substrate 206 is the plate for the CTP that is used in the printmaking process of offset printing. Light is radiated from the light-emitting device 202 to the region 206A of the substrate 206 in which the photoconductive material is disposed. The present disclosure, however, is not limited to this structure. For example, the light-emitting device and the drawing apparatus described above may be used for light exposure when a printed wiring board (PWB) is manufactured. For example, the printed wiring board may be manufactured by direct drawing on the substrate to which the photoconductive material such as photoresist is applied without using a photomask. The substrate used may be a rigid substrate or a flexible substrate. In the case of the flexible substrate, the substrate may be rotated with the substrate fixed to the cylindrical member 204 in FIG. 24 for drawing.

The light-emitting device and the drawing apparatus described above may be used for a member for which photolithography is used such as formation of a color filter in a manufacture process of a liquid crystal display (LCD), exposure of a dry film resist (DFR) to light in a manufacture process of a thin film transistor (TFT), exposure of a dry film resist (DFR) to light in a manufacture process of a plasma display panel (PDP), exposure of a photoconductive material such as photoresist to light in a manufacture process of a semiconductor element, exposure of a photoconductive material such as photoresist to light in a printmaking process of another printing other than the offset printing such as gravure printing, or exposure of a photoconductive material to light in a manufacture process of a clock part. The photolithography described herein is a technique for generating a pattern that includes an exposed portion and an unexposed portion by exposing a surface of a substance on which a photoconductive material is disposed to light into a pattern.

As for the light-emitting device and the drawing apparatus described above, a photon mode photoconductive material in which information is directly recorded by being exposed to light and a heat mode photoconductive material in which information is recorded due to heat that is generated by being exposed to light may be used. The light source for the drawing apparatus 200 may be a LED element or a laser element depending on an object to be exposed to light.

The specific exemplary embodiments of the present disclosure are described in detail. The present disclosure is not limited to the exemplary embodiments. It is clear for a person skilled in the art that various exemplary embodiments other than these may be used within the scope of the present disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A light-emitting device comprising:
   a base that is composed of a metal block that extends in a first direction;
   a plurality of light-emitting portions unaligned in the first direction and facing a front surface of the base, the plurality of light-emitting portions including a plurality of light sources that is arranged in the first direction and that is supported by a support that extends in the first direction; and
   a handle that is formed below the front surface of the base and that is to be held by an operator with the base placed on a flat surface, wherein
   the handle is on a base surface of the base, the handle having a shape that enables a finger of the operator to catch on the handle,
   the handle includes recessed portions that are formed on the base,
   the base surface is a back surface of the base, and each recessed portion is formed on the back surface of the base opposite the plurality of light-emitting portions, the recessed portions are formed along both sides of the base in a direction perpendicular to the first direction, and the support is composed of a metal block.

2. The light-emitting device according to claim 1, wherein the recessed portions have a shape that enables a finger of the operator to be inserted from each side of the base in the direction perpendicular to the first direction.

3. The light-emitting device according to claim 1, wherein each recessed portion is formed at least at an end of the base in the first direction.

4. The light-emitting device according to claim 3, wherein the handle is formed outside an outermost position on the plurality of light-emitting portions in the first direction.

5. The light-emitting device according to claim 3, wherein each recessed portion has a shape that enables a finger of the operator to be inserted from each end of the base in the first direction.

6. The light-emitting device according to claim 1, wherein each recessed portion has a depth of 10 mm or more in a depth direction from an outer surface of the base.

7. The light-emitting device according to claim 1, wherein each recessed portion is formed by cutting a part of an outer surface of the base.

8. The light-emitting device according to claim 1, wherein the base is composed of stainless steel or steel.

9. A drawing apparatus comprising:

the light-emitting device according to claim 1; and a region in which a photoconductive material is disposed, the photoconductive material relatively moving in a direction that intersects the first direction with respect to the light-emitting device and being irradiated with light from the light-emitting device.

10. The drawing apparatus according to claim 9, wherein the region is located on a surface of a cylindrical member that rotates in a circumferential direction.

* * * * *